(12) United States Patent
Quanci et al.

(10) Patent No.: US 9,243,186 B2
(45) Date of Patent: *Jan. 26, 2016

(54) COKE PLANT INCLUDING EXHAUST GAS SHARING

(75) Inventors: John F. Quanci, Haddonfield, NJ (US);
Peter U. Chun, Naperville, IL (US);
Milos J. Kaplarevic, Chicago, IL (US);
Vince G. Reiling, Wheaton, IL (US)

(73) Assignee: SunCoke Technology and Development LLC., Lisle, IL (US)

( * ) Notice: Subject to any disclaimer, the term of this patent is extended or adjusted under 35 U.S.C. 154(b) by 676 days.

This patent is subject to a terminal disclaimer.

(21) Appl. No.: 13/588,996

(22) Filed: Aug. 17, 2012

(65) Prior Publication Data

US 2014/0048405 A1    Feb. 20, 2014

(51) Int. Cl.
| | |
|---|---|
| *C10B 15/02* | (2006.01) |
| *C10B 45/00* | (2006.01) |
| *F22B 1/18* | (2006.01) |
| *C10B 5/02* | (2006.01) |
| *C10B 5/06* | (2006.01) |

(Continued)

(52) U.S. Cl.
CPC .............. *C10B 15/02* (2013.01); *C10B 45/00* (2013.01); *F22B 1/18* (2013.01); *C10B 5/00* (2013.01); *C10B 5/02* (2013.01); *C10B 5/04* (2013.01); *C10B 5/06* (2013.01); *C10B 5/08* (2013.01); *C10B 49/02* (2013.01)

(58) Field of Classification Search
CPC .............. C10B 5/00; C10B 5/04; C10B 5/02; C10B 5/12; C10B 5/14; C10B 27/00; C10B 27/02; C10B 27/04; C10B 27/06
See application file for complete search history.

(56) References Cited

U.S. PATENT DOCUMENTS

| | | | |
|---|---|---|---|
| 469,868 | A | 3/1892 | Thomas et al. |
| 1,140,798 | A | 5/1915 | Carpenter |

(Continued)

FOREIGN PATENT DOCUMENTS

| | | |
|---|---|---|
| CA | 2775992 A1 | 5/2011 |
| CN | 2064363 U | 10/1990 |

(Continued)

OTHER PUBLICATIONS

International Search Report and Written Opinion issued for PCT/US2013/054711 and mailed on Nov. 22, 2013, 13 pages.

(Continued)

*Primary Examiner* — In Suk Bullock
*Assistant Examiner* — Jonathan Pilcher
(74) *Attorney, Agent, or Firm* — Perkins Coie LLP

(57) ABSTRACT

A coke plant includes multiple coke ovens where each coke oven is adapted to produce exhaust gases, a common tunnel fluidly connected to the plurality of coke ovens and configured to receive the exhaust gases from each of the coke ovens, multiple standard heat recovery steam generators fluidly connected to the common tunnel where the ratio of coke ovens to standard heat recovery steam generators is at least 20:1, and a redundant heat recovery steam generator fluidly connected to the common tunnel where any one of the plurality of standard heat recovery steam generators and the redundant heat recovery steam generator is adapted to receive the exhaust gases from the plurality of ovens and extract heat from the exhaust gases and where the standard heat recovery steam generators and the redundant heat recovery steam generator are all connected in parallel with each other.

28 Claims, 7 Drawing Sheets

(51) Int. Cl.
  *C10B 5/08* (2006.01)
  *C10B 5/04* (2006.01)
  *C10B 49/02* (2006.01)
  *C10B 5/00* (2006.01)

(56) References Cited

U.S. PATENT DOCUMENTS

| | | |
|---|---|---|
| 1,424,777 A | 8/1922 | Schondeling |
| 1,430,027 A | 9/1922 | Plantinga |
| 1,486,401 A | 3/1924 | Van Ackeren |
| 1,572,391 A | 2/1926 | Klaiber |
| 1,721,813 A | 7/1929 | Rudolf et al. |
| 1,818,370 A | 8/1931 | Wine |
| 1,848,818 A | 3/1932 | Becker |
| 1,955,962 A | 4/1934 | Jones |
| 2,394,173 A | 2/1946 | Harris |
| 2,424,012 A | 7/1947 | Bangham et al. |
| 2,902,991 A | 9/1959 | Whitman |
| 3,462,345 A | 8/1969 | Kernan |
| 3,545,470 A | 12/1970 | Paton |
| 3,616,408 A | 10/1971 | Hickam |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,836,161 A | 9/1974 | Buhl |
| 3,839,156 A | 10/1974 | Jakobi et al. |
| 3,844,900 A | 10/1974 | Schulte |
| 3,857,758 A | 12/1974 | Mole |
| 3,875,016 A | 4/1975 | Schmidt-Balve et al. |
| 3,876,506 A | 4/1975 | Dix et al. |
| 3,878,053 A | 4/1975 | Hyde |
| 3,897,312 A | 7/1975 | Armour et al. |
| 3,906,992 A | 9/1975 | Leach |
| 3,912,091 A | 10/1975 | Thompson |
| 3,917,458 A | 11/1975 | Polak |
| 3,930,961 A | 1/1976 | Sustarsic et al. |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach et al. |
| 3,984,289 A | 10/1976 | Sustarsic et al. |
| 4,004,702 A | 1/1977 | Szendroi |
| 4,004,983 A | 1/1977 | Pries |
| 4,040,910 A | 8/1977 | Knappstein et al. |
| 4,059,885 A | 11/1977 | Oldengott |
| 4,067,462 A | 1/1978 | Thompson |
| 4,083,753 A | 4/1978 | Rogers et al. |
| 4,086,231 A | 4/1978 | Ikio |
| 4,100,033 A | 7/1978 | Holter |
| 4,111,757 A | 9/1978 | Ciarimboli |
| 4,124,450 A | 11/1978 | MacDonald |
| 4,141,796 A | 2/1979 | Clark et al. |
| 4,145,195 A | 3/1979 | Knappstein et al. |
| 4,147,230 A | 4/1979 | Ormond et al. |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,213,489 A | 7/1980 | Cain |
| 4,213,828 A | 7/1980 | Calderon |
| 4,222,748 A | 9/1980 | Argo et al. |
| 4,225,393 A | 9/1980 | Gregor et al. |
| 4,235,830 A | 11/1980 | Bennett et al. |
| 4,248,671 A | 2/1981 | Belding |
| 4,249,997 A | 2/1981 | Schmitz |
| 4,263,099 A | 4/1981 | Porter |
| 4,285,772 A | 8/1981 | Kress |
| 4,287,024 A | 9/1981 | Thompson |
| 4,289,584 A | 9/1981 | Chuss et al. |
| 4,289,585 A | 9/1981 | Wagener et al. |
| 4,303,615 A | 12/1981 | Jarmell et al. |
| 4,307,673 A | 12/1981 | Caughey |
| 4,314,787 A | 2/1982 | Kwasnik et al. |
| 4,330,372 A | 5/1982 | Cairns et al. |
| 4,334,963 A | 6/1982 | Stog |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,366,029 A | 12/1982 | Bixby et al. |
| 4,373,244 A | 2/1983 | Mertens et al. |
| 4,375,388 A | 3/1983 | Hara et al. |
| 4,392,824 A | 7/1983 | Struck et al. |
| 4,395,269 A | 7/1983 | Schuler |
| 4,396,394 A | 8/1983 | Li et al. |
| 4,396,461 A | 8/1983 | Neubaum et al. |
| 4,431,484 A | 2/1984 | Weber et al. |
| 4,439,277 A | 3/1984 | Dix |
| 4,445,977 A | 5/1984 | Husher |
| 4,446,018 A | 5/1984 | Cerwick |
| 4,448,541 A | 5/1984 | Wirtschafter |
| 4,452,749 A | 6/1984 | Kolvek et al. |
| 4,459,103 A | 7/1984 | Gieskieng |
| 4,469,446 A | 9/1984 | Goodboy |
| 4,498,786 A | 2/1985 | Ruscheweyh |
| 4,508,539 A | 4/1985 | Nakai |
| 4,527,488 A | 7/1985 | Lindgren |
| 4,568,426 A | 2/1986 | Orlando et al. |
| 4,570,670 A | 2/1986 | Johnson |
| 4,614,567 A | 9/1986 | Stahlherm et al. |
| 4,645,513 A | 2/1987 | Kubota et al. |
| 4,655,193 A | 4/1987 | Blacket |
| 4,655,804 A | 4/1987 | Kercheval et al. |
| 4,680,167 A | 7/1987 | Orlando et al. |
| 4,704,195 A | 11/1987 | Janicka et al. |
| 4,720,262 A | 1/1988 | Durr et al. |
| 4,726,465 A | 2/1988 | Kwasnik et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,114,542 A * | 5/1992 | Childress et al. ............ 201/15 |
| 5,227,106 A | 7/1993 | Kolvek |
| 5,228,955 A | 7/1993 | Westbrook |
| 5,318,671 A | 6/1994 | Pruitt |
| 5,670,025 A | 9/1997 | Baird |
| 5,928,476 A | 7/1999 | Daniels |
| 5,968,320 A * | 10/1999 | Sprague ..................... 202/113 |
| 6,017,214 A | 1/2000 | Sturgulewski |
| 6,059,932 A | 5/2000 | Sturgulewski |
| 6,139,692 A | 10/2000 | Tamura et al. |
| 6,152,668 A | 11/2000 | Knoch |
| 6,187,148 B1 | 2/2001 | Sturgulewski |
| 6,189,819 B1 | 2/2001 | Racine |
| 6,290,494 B1 | 9/2001 | Barkdoll |
| 6,596,128 B2 | 7/2003 | Westbrook |
| 6,626,984 B1 | 9/2003 | Taylor |
| 6,699,035 B2 | 3/2004 | Brooker |
| 6,758,875 B2 | 7/2004 | Reid et al. |
| 6,907,895 B2 | 6/2005 | Johnson et al. |
| 6,946,011 B2 | 9/2005 | Snyder |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Taylor et al. |
| 7,497,930 B2 | 3/2009 | Barkdoll et al. |
| 7,611,609 B1 | 11/2009 | Valia et al. |
| 7,644,711 B2 | 1/2010 | Creel |
| 7,727,307 B2 | 6/2010 | Winkler |
| 7,803,627 B2 | 9/2010 | Hodges |
| 7,827,689 B2 | 11/2010 | Crane et al. |
| 7,998,316 B2 | 8/2011 | Barkdoll et al. |
| 8,071,060 B2 | 12/2011 | Ukai et al. |
| 8,079,751 B2 | 12/2011 | Kapila et al. |
| 8,152,970 B2 | 4/2012 | Barkdoll et al. |
| 8,236,142 B2 | 8/2012 | Westbrook et al. |
| 8,266,853 B2 | 9/2012 | Bloom et al. |
| 8,398,935 B2 | 3/2013 | Howell, Jr. et al. |

(56) References Cited

U.S. PATENT DOCUMENTS

| | | |
|---|---|---|
| 2002/0134659 A1* | 9/2002 | Westbrook .................... 202/254 |
| 2006/0102420 A1 | 5/2006 | Huber et al. |
| 2008/0169578 A1 | 7/2008 | Crane et al. |
| 2008/0179165 A1 | 7/2008 | Chen et al. |
| 2008/0271985 A1 | 11/2008 | Yamasaki |
| 2009/0217576 A1 | 9/2009 | Kim et al. |
| 2009/0283395 A1 | 11/2009 | Hippe |
| 2010/0095521 A1 | 4/2010 | Bertini et al. |
| 2010/0115912 A1* | 5/2010 | Worley .................... 60/39.15 |
| 2010/0287871 A1 | 11/2010 | Bloom et al. |
| 2011/0048917 A1 | 3/2011 | Kim et al. |
| 2011/0223088 A1 | 9/2011 | Chang et al. |
| 2011/0253521 A1 | 10/2011 | Kim |
| 2012/0024688 A1 | 2/2012 | Barkdoll |
| 2012/0030998 A1 | 2/2012 | Barkdoll et al. |
| 2012/0152720 A1 | 6/2012 | Reichelt et al. |
| 2012/0228115 A1 | 9/2012 | Westbrook |
| 2013/0216717 A1 | 8/2013 | Rago et al. |
| 2014/0033917 A1 | 2/2014 | Rodgers et al. |
| 2014/0048402 A1 | 2/2014 | Quanci et al. |
| 2014/0048404 A1 | 2/2014 | Quanci et al. |
| 2014/0061018 A1 | 3/2014 | Sarpen et al. |
| 2014/0083836 A1 | 3/2014 | Quanci et al. |
| 2014/0182195 A1 | 7/2014 | Quanci et al. |
| 2014/0182683 A1 | 7/2014 | Quanci et al. |
| 2014/0183023 A1 | 7/2014 | Quanci et al. |
| 2014/0183024 A1 | 7/2014 | Chun et al. |
| 2014/0183026 A1 | 7/2014 | Quanci et al. |
| 2014/0262139 A1 | 9/2014 | Choi et al. |
| 2014/0262726 A1 | 9/2014 | West et al. |
| 2015/0247092 A1 | 9/2015 | Quanci et al. |
| 2015/0287026 A1 | 10/2015 | Yang et al. |
| 2015/0328576 A1 | 11/2015 | Quanci et al. |

FOREIGN PATENT DOCUMENTS

| | | |
|---|---|---|
| CN | 1092457 A | 9/1994 |
| CN | 1255528 A | 6/2000 |
| CN | 1358822 A | 7/2002 |
| CN | 2509188 Y | 9/2002 |
| CN | 2528771 Y | 1/2003 |
| CN | 1468364 A | 1/2004 |
| CN | 2668641 Y | 1/2005 |
| CN | 202226816 U | 5/2012 |
| DE | 212176 C | 7/1909 |
| DE | 3231697 C1 | 1/1984 |
| DE | 3329367 C1 | 11/1984 |
| DE | 19545736 A1 | 6/1997 |
| DE | 19803455 C1 | 8/1999 |
| DE | 10154785 A1 | 5/2003 |
| DE | 102009031436 A1 | 1/2011 |
| FR | 2339664 A1 | 8/1977 |
| GB | 441784 A | 1/1936 |
| GB | 606340 A | 8/1948 |
| GB | 611524 A | 11/1948 |
| GB | 725865 A | 3/1955 |
| JP | 54054101 A | 4/1979 |
| JP | 57051786 A | 3/1982 |
| JP | 57051787 A | 3/1982 |
| JP | 57083585 A | 5/1982 |
| JP | 57090092 A | 6/1982 |
| JP | 58091788 A | 5/1983 |
| JP | 59051978 A | 3/1984 |
| JP | 59053589 A | 3/1984 |
| JP | 59071388 A | 4/1984 |
| JP | 59108083 A | 6/1984 |
| JP | 59145281 A | 8/1984 |
| JP | 60004588 A | 1/1985 |
| JP | 61106690 A | 5/1986 |
| JP | 62011794 A | 1/1987 |
| JP | 62285980 A | 12/1987 |
| JP | 01103694 A | 4/1989 |
| JP | 01249886 A | 10/1989 |
| JP | H0319127 A | 1/1991 |
| JP | 03197588 A | 8/1991 |
| JP | 07188668 A | 7/1995 |
| JP | 07216357 A | 8/1995 |
| JP | 08127778 A | 5/1996 |
| JP | 2001200258 A | 7/2001 |
| JP | 2002106941 A | 4/2002 |
| JP | 200341258 A | 2/2003 |
| JP | 2003071313 A | 3/2003 |
| JP | 04159392 A | 10/2008 |
| JP | 2009144121 A | 7/2009 |
| JP | 2012102302 A | 5/2012 |
| KR | 960008754 A | 10/1996 |
| KR | 1019990054426 A | 7/1999 |
| KR | 100296700 B1 | 10/2001 |
| KR | 100797852 B1 | 1/2008 |
| KR | 1020110010452 A | 2/2011 |
| KR | 101318388 B1 | 10/2013 |
| WO | 9012074 A1 | 10/1990 |
| WO | 9945083 A1 | 9/1999 |
| WO | 2007103649 A2 | 9/2007 |
| WO | 2008034424 A1 | 3/2008 |
| WO | 2010107513 A1 | 9/2010 |
| WO | 2011000447 A1 | 1/2011 |
| WO | 2012029979 A1 | 3/2012 |

OTHER PUBLICATIONS

ASTM D5341-99(2010)e1, Standard Test Method for Measuring Coke Reactivity Index (CRI) and Coke Strength After Reaction (CSR), ASTM International, West Conshohocken, PA, 2010.

Clean coke process: process development studies by USS Engineers and Consultants, Inc., Wisconsin Tech Search, request date Oct. 5, 2011, 17 pages.

Crelling, et al., "Effects of Weathered Coal on Coking Properties and Coke Quality", Fuel, 1979, vol. 58, Issue 7, pp. 542-546.

Database WPI, Week 199115, Thomson Scientific, Lond, GB; AN 1991-107552.

Diez, et al., "Coal for Metallurgical Coke Production: Predictions of Coke Quality and Future Requirements for Cokemaking", International Journal of Coal Geology, 2002, vol. 50, Issue 14, pp. 389-412.

Rose, Harold J., "The Selection of Coals for the Manufacture of Coke," American Institute of Mining and Metallurgical Engineers, Feb. 1926, 8 pages.

JP 03-197588, Inoqu Keizo et al., Method and Equipment for Boring Degassing Hole in Coal Charge in Coke Oven, Japanese Patent (Abstract Only) Aug. 28, 1991.

JP 04-159392, Inoue Keizo et al., Method and Equipment for Opening Hole for Degassing of Coal Charge in Coke Oven, Japanese Patent (Abstract Only) Jun. 2, 1992.

U.S. Appl. No. 14/865,581, filed Sep. 25, 2015, Sarpen, Jacob P., et al.

* cited by examiner

COKE PLANT INCLUDING EXHAUST GAS SHARING

BACKGROUND OF THE INVENTION

The present invention relates generally to the field of coke plants for producing coke from coal. Coke is an important raw material used to make steel. Coke is produced by driving off the volatile fraction of coal, which is typically about 25% of the mass. Hot exhaust gases generated by the coke making process are ideally recaptured and used to generate electricity. One style of coke oven which is suited to recover these hot exhaust gases are Horizontal Heat Recovery (HHR) ovens which have a unique environmental advantage over chemical byproduct ovens based upon the relative operating atmospheric pressure conditions inside the oven. HHR ovens operate under negative pressure whereas chemical byproduct ovens operate at a slightly positive atmospheric pressure. Both oven types are typically constructed of refractory bricks and other materials in which creating a substantially airtight environment can be a challenge because small cracks can form in these structures during day-to-day operation. Chemical byproduct ovens are kept at a positive pressure to avoid oxidizing recoverable products and overheating the ovens. Conversely, HHR ovens are kept at a negative pressure, drawing in air from outside the oven to oxidize the coal volatiles and to release the heat of combustion within the oven. These opposite operating pressure conditions and combustion systems are important design differences between HHR ovens and chemical byproduct ovens. It is important to minimize the loss of volatile gases to the environment so the combination of positive atmospheric conditions and small openings or cracks in chemical byproduct ovens allow raw coke oven gas ("COG") and hazardous pollutants to leak into the atmosphere. Conversely, the negative atmospheric conditions and small openings or cracks in the HHR ovens or locations elsewhere in the coke plant simply allow additional air to be drawn into the oven or other locations in the coke plant so that the negative atmospheric conditions resist the loss of COG to the atmosphere.

SUMMARY OF THE INVENTION

One embodiment of the invention relates to a coke plant including multiple coke ovens where each coke oven is adapted to produce coke and exhaust gases, a common tunnel fluidly connected to the plurality of coke ovens and configured to receive the exhaust gases from each of the coke ovens, multiple standard heat recovery steam generators fluidly connected to the common tunnel where the ratio of coke ovens to standard heat recovery steam generators is at least 20:1, and a redundant heat recovery steam generator fluidly connected to the common tunnel where any one of the standard heat recovery steam generators and the redundant heat recovery steam generator is adapted to receive the exhaust gases from the coke ovens and extract heat from the exhaust gases and where the standard heat recovery steam generators and the redundant heat recovery steam generator are all fluidly connected in parallel with each other.

Another embodiment of the invention relates to a method of operating a coke producing plant including the steps of providing multiple coke ovens to produce coke and exhaust gases, directing the exhaust gases from each coke oven to a common tunnel, fluidly connecting multiple heat recovery steam generators to the common tunnel, operating all of the heat recovery steam generators and dividing the hot exhaust gases such that a portion of the hot exhaust gases flows through each of the heat recovery steam generators, and in a gas sharing operating mode, stopping operation of at least one of the heat recovery steam generators and dividing the exhaust gases to the remaining operating heat recovery steam generators such that a portion of the exhaust gases flows through each of the operating remaining heat recovery steam generators.

Another embodiment of the invention relates to a method of operating a coke producing plant including the steps of providing multiple coke ovens wherein each coke oven is adapted to produce coke and exhaust gases, providing a common tunnel fluidly connected to the coke ovens and being configured to receive the exhaust gases from each of the coke oven, providing multiple standard heat recovery steam generators fluidly connected to the common tunnel, wherein the ratio of coke ovens to standard heat recovery steam generators is at least 20:1, providing a redundant heat recovery steam generator and fluidly connecting the redundant heat recovery steam generator to each of the coke ovens so that the redundant heat recovery steam generator is adapted to receive and extract heat from the exhaust gases generated by any of the plurality of coke ovens.

Another embodiment of the invention relates to a method of operating a coke producing plant including the steps of providing multiple coke ovens wherein each coke oven is adapted to produce coke and exhaust gases, providing a common tunnel fluidly connected to the coke ovens and being configured to receive the exhaust gases from each of the coke ovens, providing multiple heat recovery steam generators, providing multiple crossover ducts with each crossover duct adapted to fluidly connect the common tunnel to one of the heat recovery steam generators at an intersection, and controlling operating conditions at one or more of the intersections to maintain an intersection draft of at least 0.7 inches of water.

Another embodiment of the invention relates to a coke plant including multiple coke ovens, wherein each coke oven is adapted to produce coke and exhaust gases, a common tunnel fluidly connected to the coke ovens and configured to receive the exhaust gases from each of the coke ovens, multiple standard heat recovery steam generators fluidly connected to the common tunnel, a redundant heat recovery steam generator fluidly connected to the common tunnel wherein any one of the standard heat recovery steam generators and the redundant heat recovery steam generator is adapted to receive the exhaust gases from the plurality of ovens and extract heat from the exhaust gases and wherein the standard heat recovery steam generators and the redundant heat recovery steam generator are all fluidly connected in parallel with each other, and multiple crossover ducts, wherein each of the heat recovery steam generators and the redundant heat recovery steam generator is connected to the common tunnel by one of the plurality of crossover ducts and wherein the ratio of ovens to crossover ducts is at least 50:3.

DETAILED DESCRIPTION OF THE PREFERRED EMBODIMENTS

Figure 1:
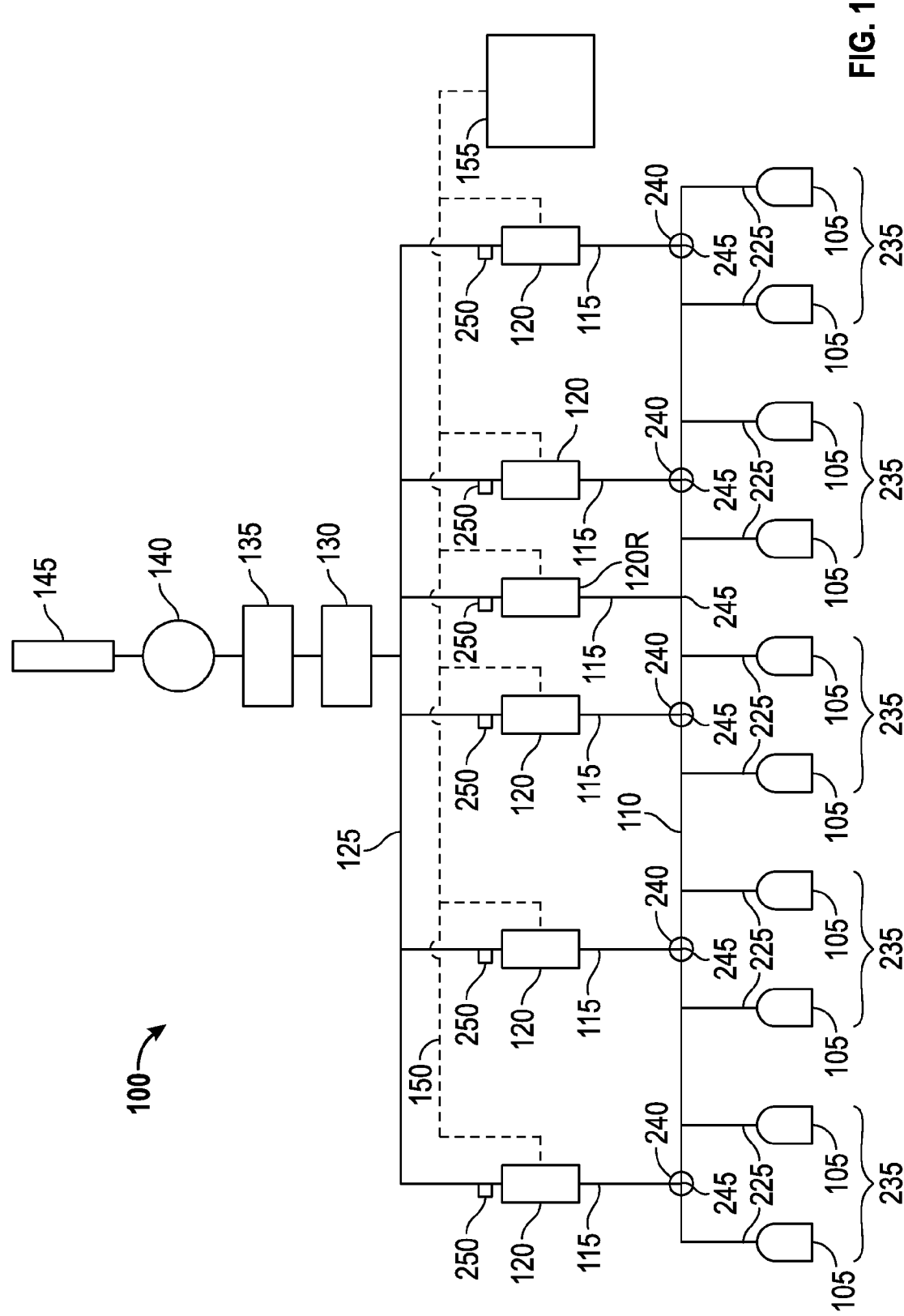
FIG. 1 is a schematic drawing of a horizontal heat recovery (HHR) coke plant, shown according to an exemplary embodiment.

Referring to FIG. 1, a HHR coke plant 100 is illustrated which produces coke from coal in a reducing environment. In general, the HHR coke plant 100 comprises at least one oven 105, along with heat recovery steam generators (HRSGs) 120 and an air quality control system 130 (e.g. an exhaust or flue gas desulfurization (FGD) system) both of which are positioned fluidly downstream from the ovens and both of which are fluidly connected to the ovens by suitable ducts. The HHR coke plant 100 preferably includes a plurality of ovens 105 and a common tunnel 110 fluidly connecting each of the ovens 105 to a plurality of HRSGs 120. One or more crossover ducts 115 fluidly connects the common tunnel 110 to the HRSGs 120. A cooled gas duct 125 transports the cooled gas from the HRSG to the flue gas desulfurization (FGD) system 130. Fluidly connected and further downstream are a baghouse 135 for collecting particulates, at least one draft fan 140 for controlling air pressure within the system, and a main gas stack 145 for exhausting cooled, treated exhaust to the environment. Steam lines 150 interconnect the HRSG and a cogeneration plant 155 so that the recovered heat can be utilized. As illustrated in FIG. 1, each "oven" shown represents ten actual ovens.

Figure 2:
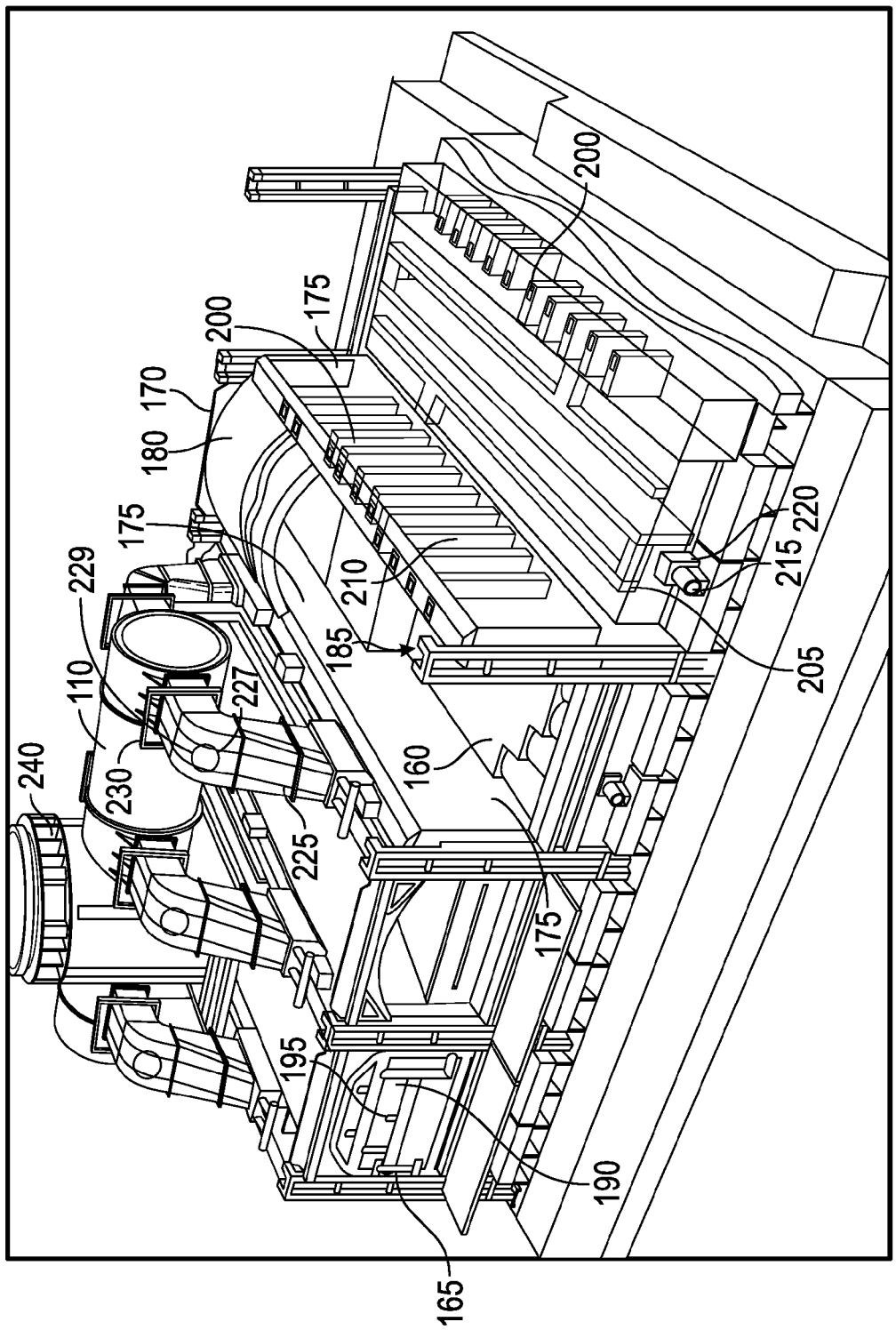
FIG. 2 is a perspective view of portion of the HHR coke plant of FIG. 1, with several sections cut away.

More structural detail of each oven 105 is shown in FIG. 2 wherein various portions of four coke ovens 105 are illustrated with sections cut away for clarity. Each oven 105 comprises an open cavity preferably defined by a floor 160, a front door 165 forming substantially the entirety of one side of the oven, a rear door 170 preferably opposite the front door 165 forming substantially the entirety of the side of the oven opposite the front door, two sidewalls 175 extending upwardly from the floor 160 intermediate the front 165 and rear 170 doors, and a crown 180 which forms the top surface of the open cavity of an oven chamber 185. Controlling air flow and pressure inside the oven chamber 185 can be critical to the efficient operation of the coking cycle and therefore the front door 165 includes one or more primary air inlets 190 that allow primary combustion air into the oven chamber 185. Each primary air inlet 190 includes a primary air damper 195 which can be positioned at any of a number of positions between fully open and fully closed to vary the amount of primary air flow into the oven chamber 185. Alternatively, the one or more primary air inlets 190 are formed through the crown 180. In operation, volatile gases emitted from the coal positioned inside the oven chamber 185 collect in the crown and are drawn downstream in the overall system into downcomer channels 200 formed in one or both sidewalls 175. The downcomer channels fluidly connect the oven chamber 185 with a sole flue 205 positioned beneath the over floor 160. The sole flue 205 forms a circuitous path beneath the oven floor 160. Volatile gases emitted from the coal can be combusted in the sole flue 205 thereby generating heat to support the reduction of coal into coke. The downcomer channels 200 are fluidly connected to uptake channels 210 formed in one or both sidewalls 175. A secondary air inlet 215 is provided between the sole flue 205 and atmosphere and the secondary air inlet 215 includes a secondary air damper 220 that can be positioned at any of a number of positions between fully open and fully closed to vary the amount of secondary air flow into the sole flue 205. The uptake channels 210 are fluidly connected to the common tunnel 110 by one or more uptake ducts 225. A tertiary air inlet 227 is provided between the uptake duct 225 and atmosphere. The tertiary air inlet 227 includes a tertiary air damper 229 which can be positioned at any of a number of positions between fully open and fully closed to vary the amount of tertiary air flow into the uptake duct 225.

In order to provide the ability to control gas flow through the uptake ducts 225 and within ovens 105, each uptake duct 225 also includes an uptake damper 230. The uptake damper 230 can be positioned at number of positions between fully open and fully closed to vary the amount of oven draft in the oven 105. As used herein, "draft" indicates a negative pressure relative to atmosphere. For example a draft of 0.1 inches of water indicates a pressure 0.1 inches of water below atmospheric pressure. Inches of water is a non-SI unit for pressure and is conventionally used to describe the draft at various locations in a coke plant. If a draft is increased or otherwise made larger, the pressure moves further below atmospheric pressure. If a draft is decreased, drops, or is otherwise made smaller or lower, the pressure moves towards atmospheric pressure. By controlling the oven draft with the uptake damper 230, the air flow into the oven from the air inlets 190, 215, 227 as well as air leaks into the oven 105 can be controlled. Typically, an oven 105 includes two uptake ducts 225 and two uptake dampers 230, but the use of two uptake ducts and two uptake dampers is not a necessity, a system can be designed to use just one or more than two uptake ducts and two uptake dampers.

In operation, coke is produced in the ovens 105 by first loading coal into the oven chamber 185, heating the coal in an oxygen depleted environment, driving off the volatile fraction of coal and then oxidizing the volatiles within the oven 105 to capture and utilize the heat given off. The coal volatiles are oxidized within the ovens over a 48-hour coking cycle, and release heat to regeneratively drive the carbonization of the coal to coke. The coking cycle begins when the front door 165 is opened and coal is charged onto the oven floor 160. The coal on the oven floor 160 is known as the coal bed. Heat from the oven (due to the previous coking cycle) starts the carbonization cycle. Preferably, no additional fuel other than that produced by the coking process is used. Roughly half of the total heat transfer to the coal bed is radiated down onto the top surface of the coal bed from the luminous flame and radiant oven crown 180. The remaining half of the heat is transferred to the coal bed by conduction from the oven floor 160 which is convectively heated from the volatilization of gases in the sole flue 205. In this way, a carbonization process "wave" of plastic flow of the coal particles and formation of high strength cohesive coke proceeds from both the top and bottom boundaries of the coal bed at the same rate, preferably meeting at the center of the coal bed after about 45-48 hours.

Accurately controlling the system pressure, oven pressure, flow of air into the ovens, flow of air into the system, and flow of gases within the system is important for a wide range of reasons including to ensure that the coal is fully coked, effectively extract all heat of combustion from the volatile gases, effectively controlling the level of oxygen within the oven chamber 185 and elsewhere in the coke plant 100, controlling the particulates and other potential pollutants, and converting the latent heat in the exhaust gases to steam which can be harnessed for generation of steam and/or electricity. Preferably, each oven 105 is operated at negative pressure so air is drawn into the oven during the reduction process due to the pressure differential between the oven 105 and atmosphere. Primary air for combustion is added to the oven chamber 185 to partially oxidize the coal volatiles, but the amount of this primary air is preferably controlled so that only a portion of the volatiles released from the coal are combusted in the oven chamber 185 thereby releasing only a fraction of their enthalpy of combustion within the oven chamber 185. The primary air is introduced into the oven chamber 185 above the coal bed through the primary air inlets 190 with the amount of primary air controlled by the primary air dampers 195. The primary air dampers 195 can be used to maintain the desired operating temperature inside the oven chamber 185. The partially combusted gases pass from the oven chamber 185 through the downcomer channels 200 into the sole flue 205 where secondary air is added to the partially combusted gases. The secondary air is introduced through the secondary air inlet 215 with the amount of secondary air controlled by the secondary air damper 220. As the secondary air is introduced, the partially combusted gases are more fully combusted in the sole flue 205 extracting the remaining enthalpy of combustion which is conveyed through the oven floor 160 to add heat to the oven chamber 185. The nearly fully combusted exhaust gases exit the sole flue 205 through the uptake channels 210 and then flow into the uptake duct 225. Tertiary air is added to the exhaust gases via the tertiary air inlet 227 with the amount of tertiary air controlled by the tertiary air damper 229 so that any remaining fraction of uncombusted gases in the exhaust gases are oxidized downstream of the tertiary air inlet 227.

At the end of the coking cycle, the coal has carbonized to produce coke. The coke is preferably removed from the oven 105 through the rear door 170 utilizing a mechanical extraction system. Finally, the coke is quenched (e.g., wet or dry quenched) and sized before delivery to a user.

As shown in FIG. 1, a sample HHR coke plant 100 includes a number of ovens 105 that are grouped into oven blocks 235. The illustrated HHR coke plant 100 includes five oven blocks 235 of twenty ovens each, for a total of one hundred ovens. All of the ovens 105 are fluidly connected by at least one uptake duct 225 to the common tunnel 110 which is in turn fluidly connected to each HRSG 120 by a crossover duct 115. Each oven block 235 is associated with a particular crossover duct 115. Under normal operating conditions, the exhaust gases from each oven 105 in an oven block 235 flow through the common tunnel 110 to the crossover duct 115 associated with each respective oven block 235. Half of the ovens in an oven block 235 are located on one side of an intersection 245 of the common tunnel 110 and a crossover duct 115 and the other half of the ovens in the oven block 235 are located on the other side of the intersection 245. Under normal operating conditions there will be little or no net flow along the length of the common tunnel 110; instead, the exhaust gases from each oven block 235 will typically flow through the crossover duct 115 associated with that oven block 235 to the related HRSG 120.

In the HRSG 120, the latent heat from the exhaust gases expelled from the ovens 105 is recaptured and preferably used to generate steam. The steam produced in the HRSGs 120 is routed via steam lines 150 to the cogeneration plant 155, where the steam is used to generate electricity. After the latent heat from the exhaust gases has been extracted and collected, the cooled exhaust gases exit the HRSG 120 and enter the cooled gas duct 125. All of the HRSGs 120 are fluidly connected to the cooled gas duct 125. With this structure, all of the components between the ovens 105 and the cooled gas duct 125 including the uptake ducts 225, the common tunnel 110, the crossover duct 115s, and the HRSGs 120 form the hot exhaust system. The combined cooled exhaust gases from all of the HRSGs 120 flow to the FGD system 130, where sulfur oxides ($SO_X$) are removed from the cooled exhaust gases. The cooled, desulfurized exhaust gases flow from the FGD system 130 to the baghouse 135, where particulates are removed, resulting in cleaned exhaust gases. The cleaned exhaust gases exit the baghouse 135 through the draft fan 140 and are dispersed to the atmosphere via the main gas stack 145. The draft fan 140 creates the draft required to cause the described flow of exhaust gases and depending upon the size and operation of the system, one or more draft fans 140 can be used. Preferably, the draft fan 140 is an induced draft fan. The draft fan 140 can be controlled to vary the draft through the coke plant 100. Alternatively, no draft fan 140 is included and the necessary draft is produced due to the size of the main gas stack 145.

Under normal operating conditions, the entire system upstream of the draft fan 140 is maintained at a draft. Therefore, during operation, there is a slight bias of airflow from the ovens 105 through the entire system to the draft fan 140. For emergency situations, a bypass exhaust stack 240 is provided for each oven block 235. Each bypass exhaust stack 240 is located at an intersection 245 between the common tunnel 110 and a crossover duct 115. Under emergency situations, hot exhaust gases emanating from the oven block 235 associated with a crossover duct 115 can be vented to atmosphere via the related bypass exhaust stack 240. The release of hot exhaust gas through the bypass exhaust stack 240 is undesirable for many reasons including environmental concerns and energy consumption. Additionally, the output of the cogeneration plant 155 is reduced because the offline HRSG 120 is not producing steam.

In a conventional HHR coke plant when a HRSG is offline due to scheduled maintenance, an unexpected emergency, or other reason, the exhaust gases from the associated oven block can be vented to atmosphere through the associated bypass exhaust stack because there is nowhere else for the exhaust gases to go due to gas flow limitations imposed by the common tunnel design and draft. If the exhaust gases were not vented to atmosphere through the bypass exhaust stack, they would cause undesired outcomes (e.g., positive pressure relative to atmosphere in an oven or ovens, damage to the offline HRSG) at other locations in the coke plant.

In the HHR coke plant 100 described herein, it is possible to avoid the undesirable loss of untreated exhaust gases to the environment by directing the hot exhaust gases that would normally flow to an offline HRSG to one or more of the online HRSGs 120. In other words, it is possible to share the exhaust or flue gases of each oven block 235 along the common tunnel 110 and among multiple HRSGs 120 rather than a conventional coke plant where the vast majority of exhaust gases from an oven block flow to the single HRSG associated with that oven block. While some amount of exhaust gases may flow along the common tunnel of a conventional coke plant (e.g., from a first oven block to the HRSG associated with the adjacent oven block), a conventional coke plant cannot be operated to transfer all of the exhaust gases from an oven block associated with an offline HRSG to one or more online HRSGs. In other words, it is not possible in a conventional coke plant for all of the exhaust gases that would typically flow to a first offline HRSG to be transferred or gas shared along the common tunnel to one or more different online HRSGs. "Gas sharing" is possible by implementing an increased effective flow area of the common tunnel 110, an increased draft in the common tunnel 110, the addition of at least one redundant HRSG 120R, as compared to a conventional HHR coke plant, and by connecting all of the HRSGs 120 (standard and redundant) in parallel with each other. With gas sharing, it is possible to eliminate the undesirable expulsion of hot gases through the bypass exhaust stacks 240. In an example of a conventional HHR coke plant, an oven block of twenty coke ovens and a single HRSG are fluidly connected via a first common tunnel, two oven blocks totaling forty coke ovens and two HRSGs are connected by a second common tunnel, and two oven blocks totaling forty coke ovens and two HRSGs are connected by a third common tunnel, but gas sharing of all of the exhaust gases along the second common tunnel and along the third common tunnel from an oven block associated with an offline HRSG to the remaining online HRSG is not possible.

Maintaining drafts having certain minimum levels or targets with the hot exhaust gas sharing system is necessary for effective gas sharing without adversely impacting the performance of the ovens 105. The values recited for various draft targets are measured under normal steady-state operating conditions and do not include momentary, intermittent, or transient fluctuations in the draft at the specified location. Each oven 105 must maintain a draft ("oven draft"), that is, a negative pressure relative to atmosphere. Typically, the targeted oven draft is at least 0.1 inches of water. In some embodiments, the oven draft is measured in the oven chamber 185. During gas sharing along the common tunnel 110, the "intersection draft" at one or more of the intersections 245 between the common tunnel 110 and the crossover ducts 115 and/or the "common tunnel draft" at one or more locations along the common tunnel 110 must be above a targeted draft (e.g., at least 0.7 inches of water) to ensure proper operation of the system. The common tunnel draft is measured upstream of the intersection draft (i.e., between an intersection 245 and the coke ovens 105) and is therefore typically lower than the intersection draft. In some embodiments the targeted intersection draft and/or the targeted common tunnel draft during gas sharing can be at least 1.0 inches of water and in other embodiments the targeted intersection draft and/or the targeted common tunnel draft during gas sharing can be at least 2.0 inches of water. Hot exhaust gas sharing eliminates the discharge of hot exhaust gases to atmosphere and increases the efficiency of the cogeneration plant 155. It is important to note that a hot exhaust gas sharing HHR coke plant 100 as described herein can be newly constructed or an existing, conventional HHR coke plant can be retrofitted according to the innovations described herein.

Figure 3:
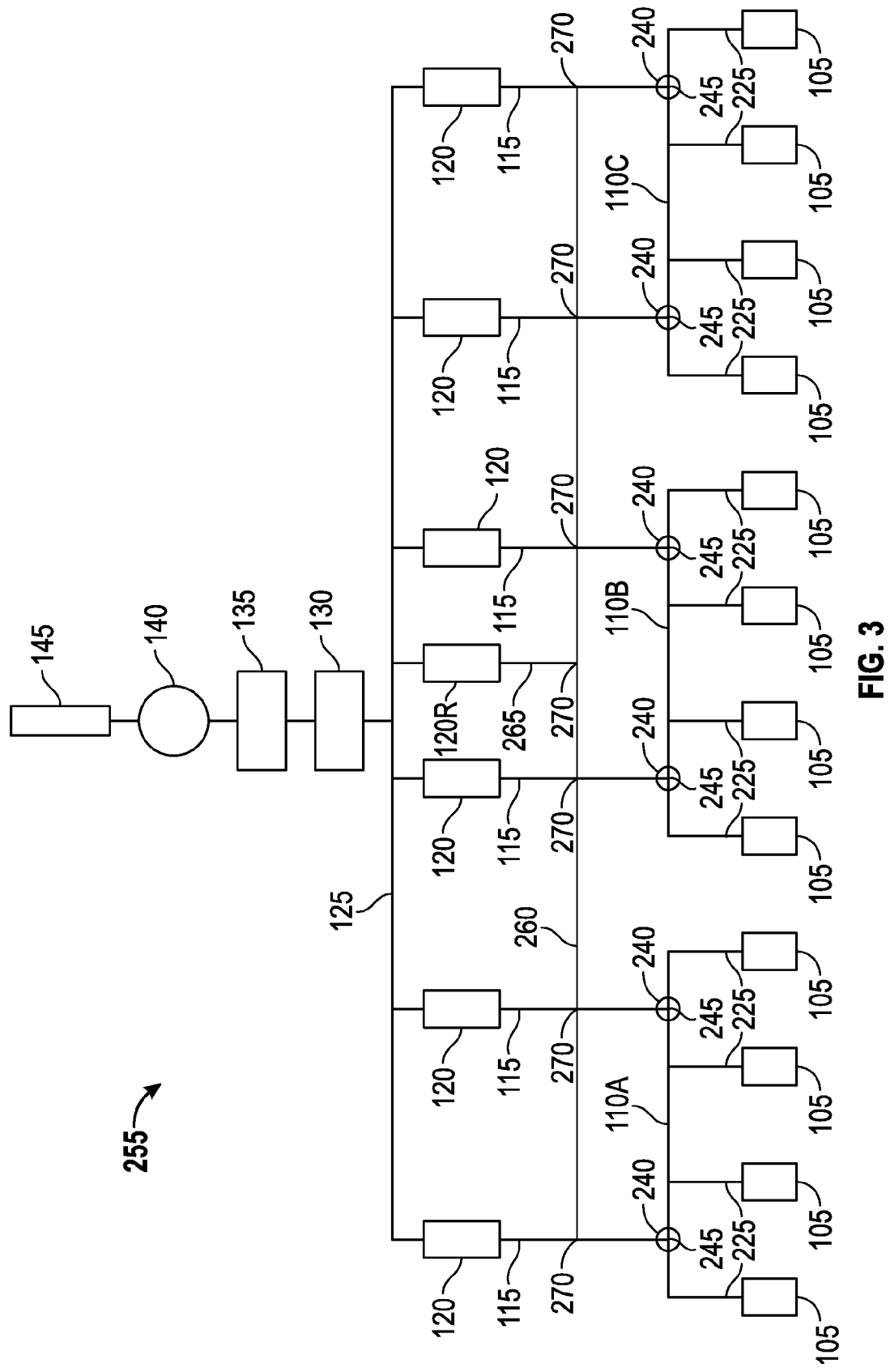
FIG. 3 is a schematic drawing of a HHR coke plant, shown according to an exemplary embodiment.

In an exhaust gas sharing system in which one or more HRSG 120 is offline, the hot exhaust gases ordinarily sent to the offline HRSGs 120 are not vented to atmosphere through the related bypass exhaust stack 240, but are instead routed through the common tunnel 110 to one or more different HRSGs 120. To accommodate the increased volume of gas flow through the common tunnel 110 during gas sharing, the effective flow area of the common tunnel 110 is greater than that of the common tunnel in a conventional HHR coke plant. This increased effective flow area can be achieved by increasing the inner diameter of the common tunnel 110 or by adding one or more additional common tunnels 110 to the hot exhaust system in parallel with the existing common tunnel 110 (as shown in FIG. 3). In one embodiment, the single common tunnel 110 has an effective flow inner diameter of nine feet. In another embodiment, the single common tunnel 110 has an effective flow inner diameter of eleven feet. Alternatively, a dual common tunnel configuration, a multiple common tunnel configuration, or a hybrid dual/multiple tunnel configuration can be used. In a dual common tunnel configuration, the hot exhaust gasses from all of the ovens are directly distributed to two parallel, or almost parallel, common tunnels, which can be fluidly connected to each other at different points along the tunnels' length. In a multiple common tunnel configuration, the hot exhaust gasses from all of the ovens are directly distributed to two or more parallel, or almost parallel, common hot tunnels, which can be fluidly connected to each other at different points along the tunnels' length. In a hybrid dual/multiple common tunnel, the hot exhaust gasses from all of the ovens are directly distributed to two or more parallel, or almost parallel, hot tunnels, which can be fluidly connected to each other at different points along the tunnels' length. However, one, two, or more of the hot tunnels may not be a true common tunnel. For example, one or both of the hot tunnels may have partitions or be separated along the length of its run.

Hot exhaust gas sharing also requires that during gas sharing the common tunnel 110 be maintained at a higher draft than the common tunnel of a conventional HHR coke plant. In a conventional HHR coke plant, the intersection draft and the common tunnel draft are below 0.7 inches of water under normal steady-state operating conditions. A conventional HHR coke plant has never been operated such that the common tunnel operates at a high intersection draft or a high common tunnel draft (at or above 0.7 inches of water) because of concerns that the high intersection draft and the high common tunnel draft would result in excess air in the oven chambers. To allow for gas sharing along the common tunnel 110, the intersection draft at one or more intersections 245 must be maintained at least at 0.7 inches of water. In some embodiments, the intersection draft at one or more intersections 245 is maintained at least at 1.0 inches of water or at least at 2.0 inches of water. Alternatively or additionally, to allow for gas sharing along the common tunnel 110, the common tunnel draft at one or more locations along the common tunnel 110 must be maintained at least at 0.7 inches of water. In some embodiments, the common tunnel draft at one or more locations along the common tunnel 110 is maintained at least at 1.0 inches of water or at least at 2.0 inches of water. Maintaining such a high draft at one or more intersections 245 or at one or more locations along the common tunnel 110 ensures that the oven draft in all of the ovens 105 will be at least 0.1 inches of water when a single HSRG 120 is offline and provides sufficient draft for the exhaust gases from the oven block 235 associated with the offline HRSG 120 to flow to an online HSRG 120. While in the gas sharing operating mode (i.e., when at least one HRSG 120 is offline), the draft along the common tunnel 110 and at the different intersections 245 will vary. For example, if the HRSG 120 closest to one end of the common tunnel 110 is offline, the common tunnel draft at the proximal end of the common tunnel 110 will be around 0.1 inches of water and the common tunnel draft at the opposite, distal end of the common tunnel 110 will be around 1.0 inches of water. Similarly, the intersection draft at the intersection 245 furthest from the offline HRSG 120 will be relatively high (i.e., at least 0.7 inches of water) and the intersection draft at the intersection 245 associated with the offline HRSG 120 will be relatively low (i.e., lower than the intersection draft at the previously-mentioned intersection 245 and typically below 0.7 inches of water).

Alternatively, the HHR coke plant 100 can be operated in two operating modes: a normal operating mode for when all of the HRSGs 120 are online and a gas sharing operating mode for when at least one of the HRSGs 120 is offline. In the normal operating mode, the common tunnel 110 is maintained at a common tunnel draft and intersection drafts similar to those of a conventional HHR coke plant (typically, the intersection draft is between 0.5 and 0.6 inches of water and the common tunnel draft at a location near the intersection is between 0.4 and 0.5 inches of water). The common tunnel draft and the intersection draft can vary during the normal operating mode and during the gas sharing mode. In most situations, when a HRSG 120 goes offline, the gas sharing mode begins and the intersection draft at one or more intersections 245 and/or the common tunnel draft at one or more locations along the common tunnel 110 is raised. In some situations, for example, when the HRSG 120 furthest from the redundant HRSG 120R is offline, the gas sharing mode will begin and will require an intersection draft and/or a common tunnel draft of at least 0.7 inches of water (in some embodiments, between 1.2 and 1.3 inches of water) to allow for gas sharing along the common tunnel 110. In other situations, for example, when a HRSG 120 positioned next to the redundant HRSG 120R which is offline, the gas sharing mode may not be necessary, that is gas sharing may be possible in the normal operating mode with the same operating conditions prior to the HRSG 120 going offline, or the gas sharing mode will begin and will require only a slight increase in the intersection draft and/or a common tunnel draft. In general, the need to go to a higher draft in the gas sharing mode will depend on where the redundant HRSG 120R is located relative to the offline HRSG 120. The further away the redundant HRSG 120R fluidly is form the tripped HRSG 120, the higher the likelihood that a higher draft will be needed in the gas sharing mode.

Increasing the effective flow area and the intersection draft and/or the common tunnel draft to the levels described above also allows for more ovens 105 to be added to an oven block 235. In some embodiments, up to one hundred ovens form an oven block (i.e., are associated with a crossover duct).

The HRSGs 120 found in a conventional HHR coke plant at a ratio of twenty ovens to one HRSG are referred to as the "standard HRSGs." The addition of one or more redundant HRSGs 120R results in an overall oven to HRSG ratio of less than 20:1. Under normal operating conditions, the standard HRSGs 120 and the redundant HRSG 120R are all in operation. It is impractical to bring the redundant HRSG 120R online and offline as needed because the start-up time for a HRSG would result in the redundant HRSG 120R only being available on a scheduled basis and not for emergency purposes. An alternative to installing one or more redundant HRSGs would be to increase the capacity of the standard HRSGs to accommodate the increased exhaust gas flow during gas sharing. Under normal operating conditions with all of the high capacity HRSGs online, the exhaust gases from each oven block are conveyed to the associated high capacity HRSGs. In the event that one of the high capacity HRSGs goes offline, the other high capacity HRSGs would be able to accommodate the increased flow of exhaust gases.

In a gas sharing system as described herein, when one of the HRSGs 120 is offline the exhaust gases emanating from the various ovens 105 are shared and distributed among the remaining online HRSGs 120 such that a portion of the total exhaust gases are routed through the common tunnel 110 to each of the online HRSGs 120 and no exhaust gas is vented to atmosphere. The exhaust gases are routed amongst the various HRSGs 120 by adjusting a HRSG valve 250 associated with each HRSG 120 (shown in FIG. 1). The HRSG valve 250 can be positioned on the upstream or hot side of the HRSG 120, but is preferably positioned on the downstream or cold side of the HRSG 120. The HRSG valves 250 are variable to a number of positions between fully opened and fully closed and the flow of exhaust gases through the HRSGs 120 is controlled by adjusting the relative position of the HRSG valves 250. When gas is shared, some or all of the operating HRSGs 120 will receive additional loads. Because of the resulting different flow distributions when a HRSG 120 is offline, the common tunnel draft along the common tunnel 110 will change. The common tunnel 110 helps to better distribute the flow among the HRSGs 120 to minimize the pressure differences throughout the common tunnel 110. The common tunnel 110 is sized to help minimize peak flow velocities (e.g. below 120 ft/s) and to reduce potential erosion and acoustic concerns (e.g. noise levels below 85 dB at 3 ft). When an HRSG 120 is offline, there can be higher than normal peak mass flow rates in the common tunnel, depending on which HRSG 120 is offline. During such gas sharing periods, the common tunnel draft may need to be increased to maintain the targeted oven drafts, intersection drafts, and common tunnel draft.

In general, a larger common tunnel 110 can correlate to larger allowable mass flow rates relative to a conventional common tunnel for the same given desired pressure difference along the length of the common tunnel 110. The converse is also true, the larger common tunnel 110 can correlate to smaller pressure differences relative to a conventional common tunnel for the same given desired mass flow rate along the length of the common tunnel 110. Larger means larger effective flow area and not necessarily larger geometric cross sectional area. Higher common tunnel drafts can accommodate larger mass flow rates through the common tunnel 110. In general, higher temperatures can correlate to lower allowable mass flow rates for the same given desired pressure difference along the length of the tunnel. Higher exhaust gas temperatures should result in volumetric expansion of the gases. Since the total pressure losses can be approximately proportional to density and proportional to the square of the velocity, the total pressure losses can be higher for volumetric expansion because of higher temperatures. For example, an increase in temperature can result in a proportional decrease in density. However, an increase in temperature can result in an accompanying proportional increase in velocity which affects the total pressure losses more severely than the decrease in density. Since the effect of velocity on total pressure can be more of a squared effect while the density effect can be more of a linear one, there should be losses in total pressure associated with an increase in temperature for the flow in the common tunnel 110. Multiple, parallel, fluidly connected common tunnels (dual, multiple, or hybrid dual/multiple configurations) may be preferred for retrofitting existing conventional HHR coke plants into the gas sharing HHR coke plants described herein.

Although the sample gas-sharing HHR coke plant 100 illustrated in FIG. 1 includes one hundred ovens and six HRSGs (five standard HRSGs and one redundant HRSG), other configurations of gas-sharing HHR coke plants 100 are possible. For example, a gas-sharing HHR coke plant similar to the one illustrated in FIG. 1 could include one hundred ovens, and seven HRSGs (five standard HRSGs sized to handle the exhaust gases from up to twenty ovens and two redundant HRSGs sized to handle the exhaust gases from up to ten ovens (i.e., smaller capacity than the single redundant HRSG used in the coke plant 100 illustrated in FIG. 1)).

As shown in FIG. 3, in HHR coke plant 255, an existing conventional HHR coke plant has been retrofitted to a gas-sharing coke plant. Existing partial common tunnels 110A, 110B, and 110C each connect a bank of forty ovens 105. An additional common tunnel 260 fluidly connected to all of the ovens 105 has been added to the existing partial common tunnels 110A, 110B, and 110C. The additional common tunnel 260 is connected to each of the crossover ducts 115 extending between the existing partial common tunnels 110A, 110B, and 110C and the standard HRSGs 120. The redundant HRSG 120R is connected to the additional common tunnel 260 by a crossover duct 265 extending to the additional common tunnel 260. To allow for gas sharing, the intersection draft at one or more intersections 245 between the existing partial common tunnels 110A, 110B, 110C and the crossover ducts 115 and/or the common tunnel draft at one or more location along each of the partial common tunnels 110A, 110B, 110C must be maintained at least at 0.7 inches of water. The draft at one or more of the intersections 270 between the additional common tunnel 260 and the crossover ducts 115 and 265 will be higher than 0.7 inches of water (e.g., 1.5 inches of water). In some embodiments, the inner effective flow diameter of the additional common tunnel 260 can be as small as eight feet or as large as eleven feet. In one embodiment, the inner effective flow diameter of the additional common tunnel 260 is nine feet. Alternatively, as a further retrofit, the partial common tunnels 110A, 110B, and 110C are fluidly connected to one another, effectively creating two common tunnels (i.e., the combination of common tunnels 110A, 110B, and 110C and the additional common tunnel 260).

Figure 4:
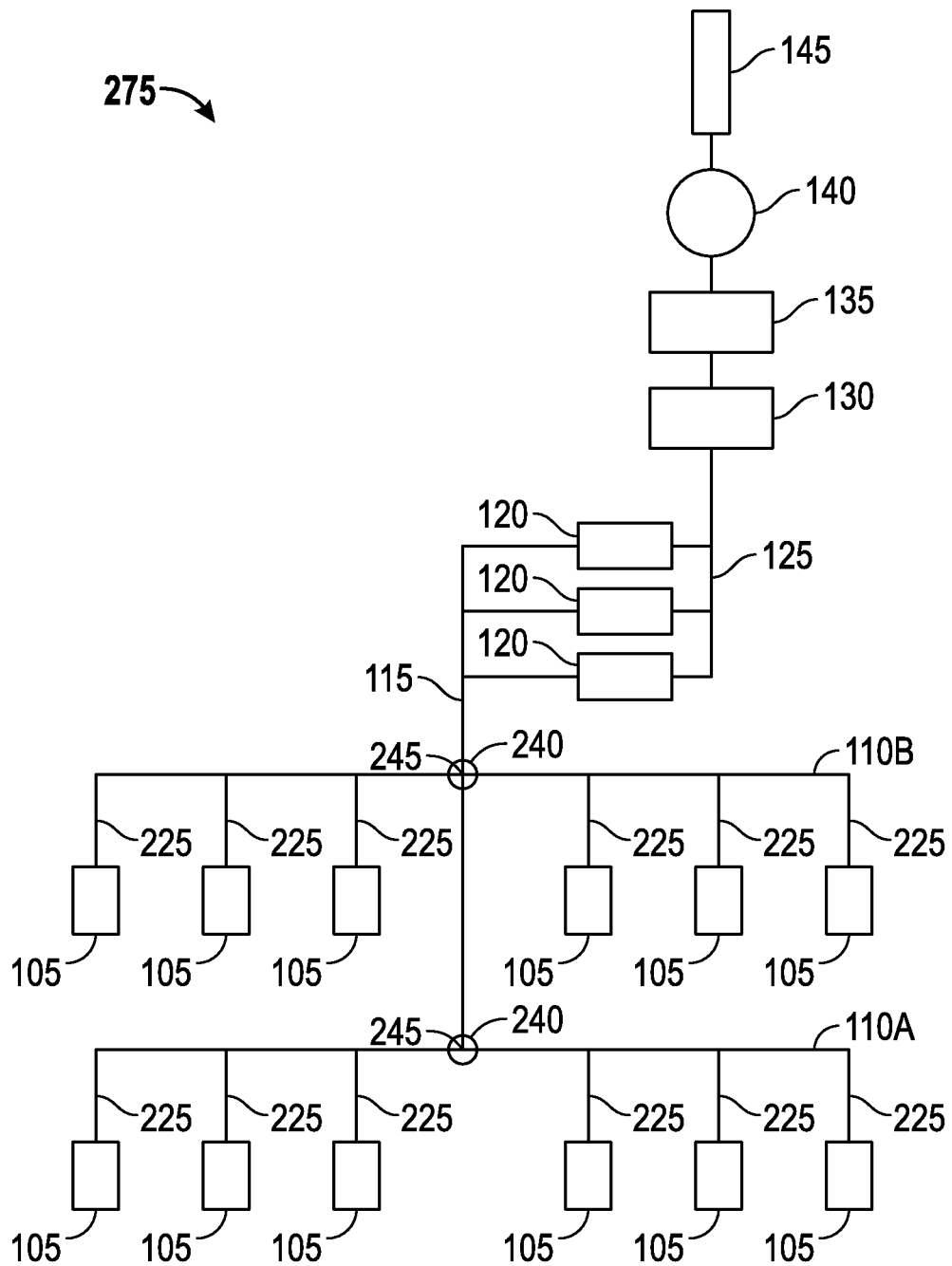
FIG. 4 is a schematic drawing of a HHR coke plant, shown according to an exemplary embodiment.
Figure 5:
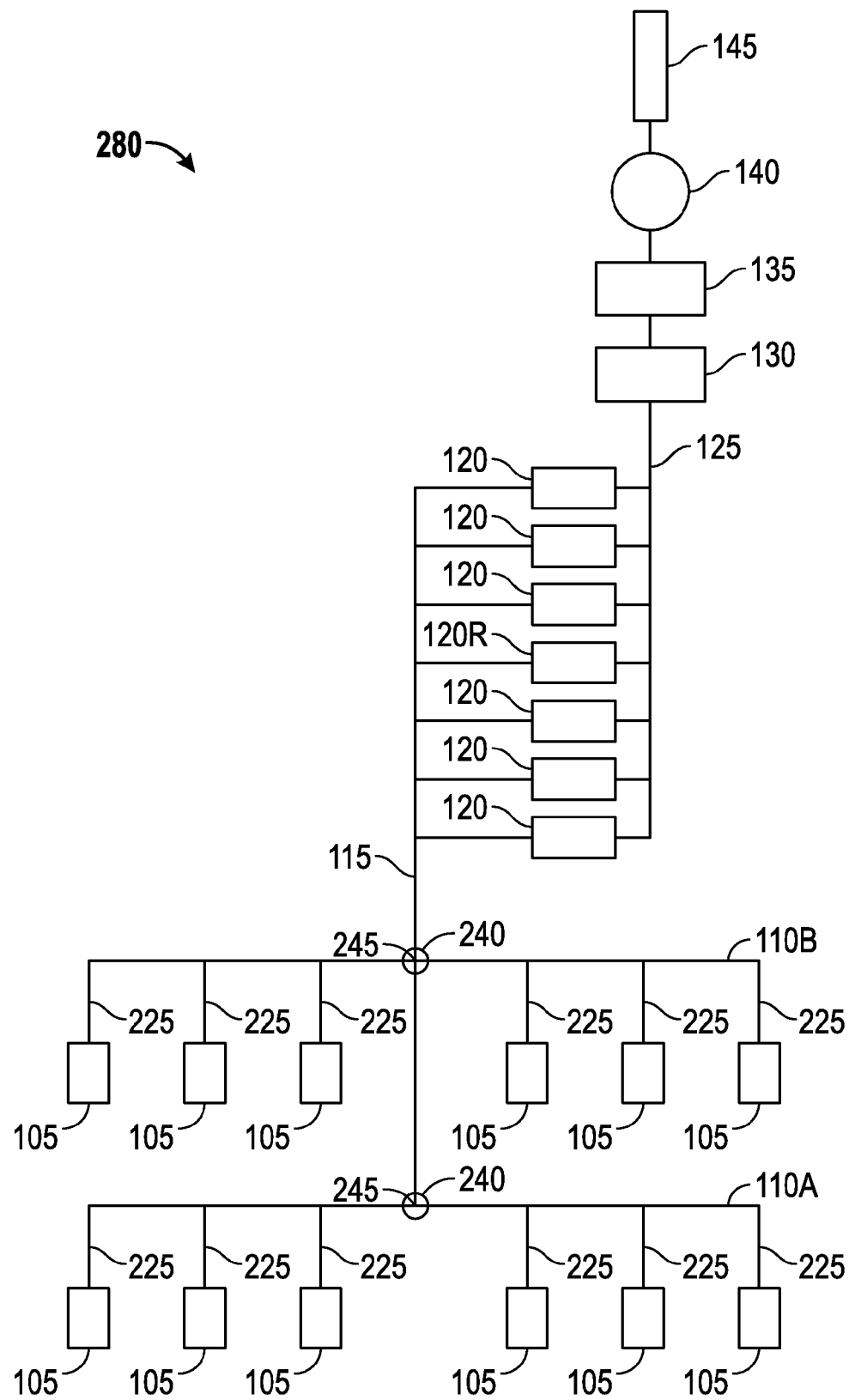
FIG. 5 is a schematic drawing of a HHR coke plant, shown according to an exemplary embodiment.

As shown in FIG. 4, in HHR coke plant 275, a single crossover duct 115 fluidly connects three high capacity HRSGs 120 to two partial common tunnels 110A and 110B. The single crossover duct 115 essentially functions as a header for the HRSGs 120. The first partial common tunnel 110A services an oven block of sixty ovens 105 with thirty ovens 105 on one side of the intersection 245 between the partial common tunnel 110A and the crossover duct 115 and thirty ovens 105 on the opposite side of the intersection 245. The ovens 105 serviced by the second partial common tunnel 110B are similarly arranged. The three high capacity HRSGs are sized so that only two HRSGs are needed to handle the exhaust gases from all one hundred twenty ovens 105, enabling one HRSG to be taken offline without having to vent exhaust gases through a bypass exhaust stack 240. The HHR coke plant 275 can be viewed as having one hundred twenty ovens and three HRSGs (two standard HRSGs and one redundant HRSG) for an oven to standard HRSG ratio of 60:1. Alternatively, as shown in FIG. 5, in the HHR coke plant 280, a redundant HRSG 120R is added to six standard HRSGs 120 instead of using the three high capacity HRSGs 120 shown in FIG. 4. The HHR coke plant 280 can be viewed as having one hundred twenty ovens and seven HRSGs (six standard HRSGs and one redundant HRSG) for an oven to standard HRSG ratio of 20:1). In some embodiments, coke plants 275 and 280 are operated at least during periods of maximum mass flow rates through the intersections 245 to maintain a target intersection draft at one or more of the intersections 245 and/or a target common tunnel draft at one or more locations along each of the common tunnels 110A and 110B of at least 0.7 inches of water. In one embodiment, the target intersection draft at one or more of the intersections 245 and/or the target common tunnel draft at one or more locations along each of the common tunnels 110A and 110B is 0.8 inches of water. In another embodiment, the target intersection draft at one or more of the intersections 245 and/or the common tunnel draft at one or more locations along each of the common tunnels 110A and 110B is 1.0 inches of water. In other embodiments, the target intersection draft at one or more of the intersections 245 and/or the target common tunnel draft at one or more locations along each of the common tunnels 110A and 110B is greater than 1.0 inches of water and can be 2.0 inches of water or higher.

Figure 6:
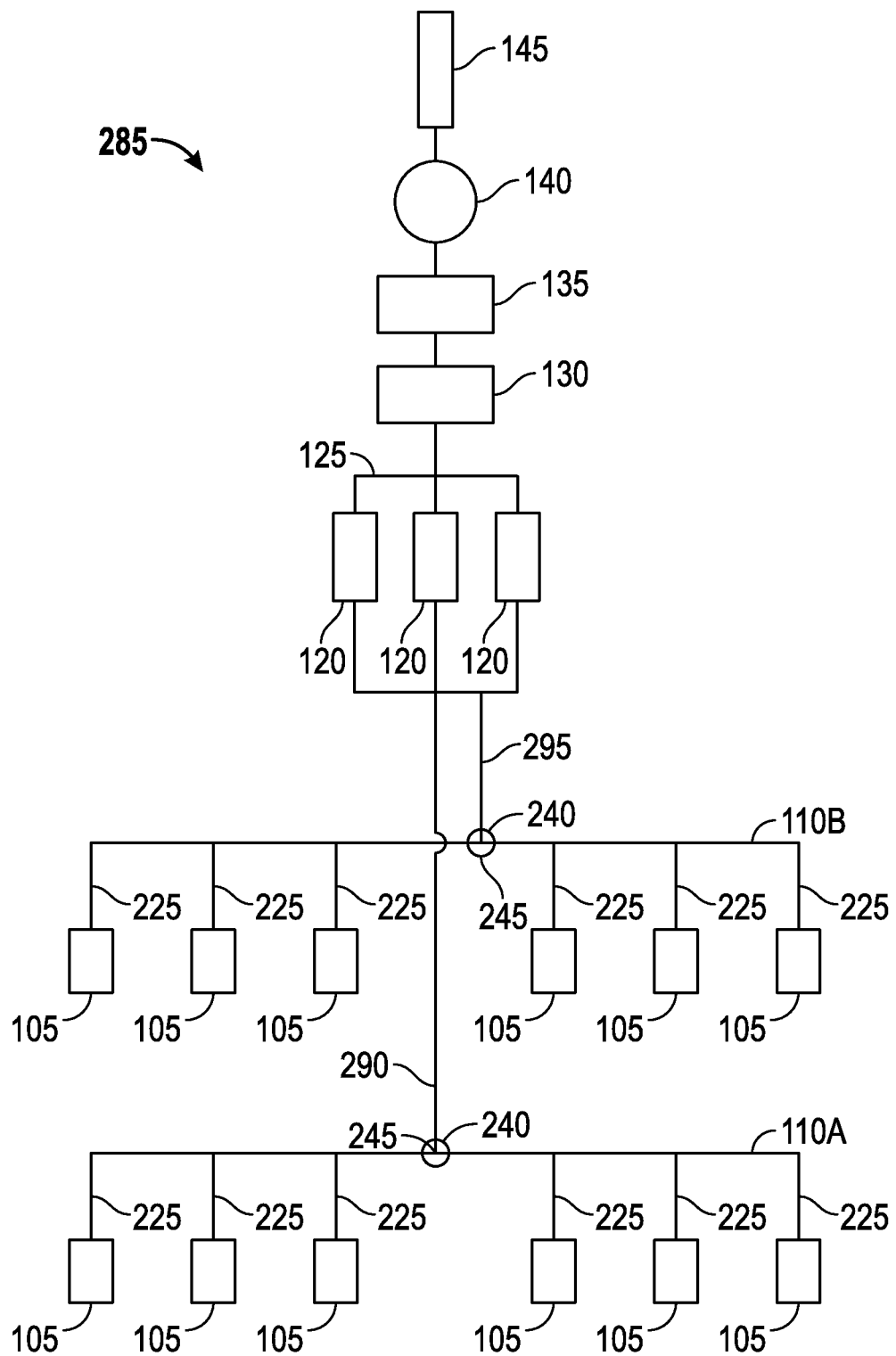
FIG. 6 is a schematic drawing of a HHR coke plant, shown according to an exemplary embodiment.

As shown in FIG. 6, in HHR coke plant 285, a first crossover duct 290 connects a first partial common tunnel 110A to three high capacity HRSGs 120 arranged in parallel and a second crossover duct 295 connects a second partial common tunnel 110B to the three high capacity HRSGs 120. The first partial common tunnel 110A services an oven block of sixty ovens 105 with thirty ovens 105 on one side of the intersection 245 between the first partial common tunnel 110A and the first crossover duct 290 and thirty ovens 105 on the opposite side of the intersection 245. The second partial common tunnel 110B services an oven block of sixty ovens 105 with thirty ovens 105 on one side of the intersection 245 between the second common tunnel 110B and the second crossover duct 295 and thirty ovens 105 on the opposite side of the intersection 245. The three high capacity HRSGs are sized so that only two HRSGs are needed to handle the exhaust gases from all one hundred twenty ovens 105, enabling one HRSG to be taken offline without having to vent exhaust gases through a bypass exhaust stack 240. The HHR coke plant 285 can be viewed as having one hundred twenty ovens and three HRSGs (two standard HRSGs and one redundant HRSG) for an oven to standard HRSG ratio of 60:1 In some embodiments, coke plant 285 is operated at least during periods of maximum mass flow rates through the intersections 245 to maintain a target intersection draft at one or more of the intersections 245 and/or a target common tunnel draft at one or more locations along each of the common tunnels 110A and 110B of at least 0.7 inches of water. In one embodiment, the target intersection draft at one or more of the intersections 245 and/or the target common tunnel draft at one or more locations along each of the common tunnels 110A and 110B is 0.8 inches of water. In another embodiment, the target intersection draft at one or more of the intersections 245 and/or the common tunnel draft at one or more locations along each of the common tunnels 110A and 110B is 1.0 inches of water. In other embodiments, the target intersection draft at one or more of the intersections 245 and/or the target common tunnel draft at one or more locations along each of the common tunnels 110A and 110B is greater than 1.0 inches of water and can be 2.0 inches of water or higher.

Figure 7:
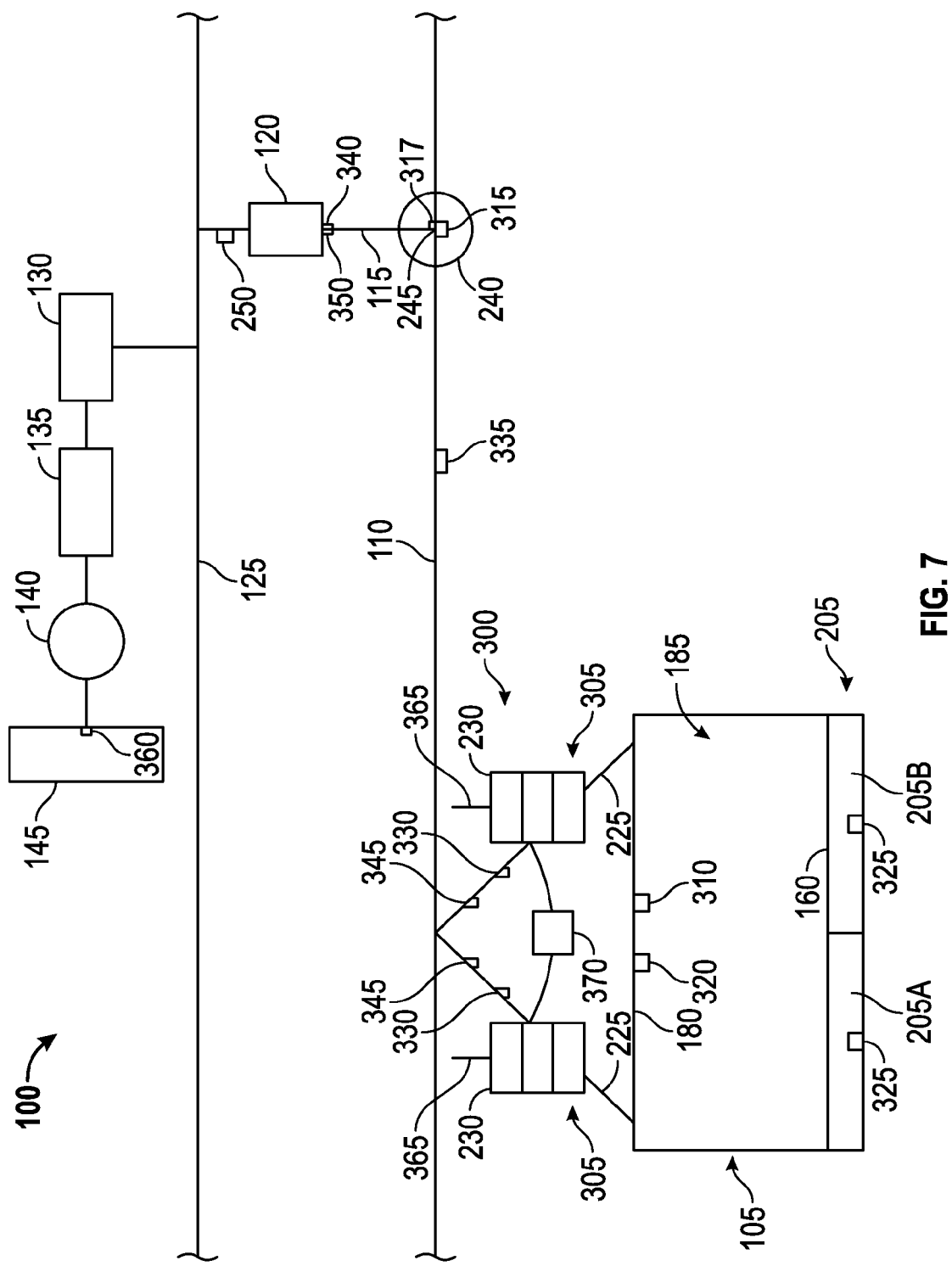
FIG. 7 is a schematic view of a portion of the coke plant of FIG. 1.

FIG. 7 illustrates a portion of the coke plant 100 including an automatic draft control system 300. The automatic draft control system 300 includes an automatic uptake damper 305 that can be positioned at any one of a number of positions between fully open and fully closed to vary the amount of oven draft in the oven 105. The automatic uptake damper 305 is controlled in response to operating conditions (e.g., pressure or draft, temperature, oxygen concentration, gas flow rate) detected by at least one sensor. The automatic control system 300 can include one or more of the sensors discussed below or other sensors configured to detect operating conditions relevant to the operation of the coke plant 100.

An oven draft sensor or oven pressure sensor 310 detects a pressure that is indicative of the oven draft and the oven draft sensor 310 can be located in the oven crown 180 or elsewhere in the oven chamber 185. Alternatively, the oven draft sensor 310 can be located at either of the automatic uptake dampers 305, in the sole flue 205, at either oven door 165 or 170, or in the common tunnel 110 near above the coke oven 105. In one embodiment, the oven draft sensor 310 is located in the top of the oven crown 180. The oven draft sensor 310 can be located flush with the refractory brick lining of the oven crown 180 or could extend into the oven chamber 185 from the oven crown 180. A bypass exhaust stack draft sensor 315 detects a pressure that is indicative of the draft at the bypass exhaust stack 240 (e.g., at the base of the bypass exhaust stack 240). In some embodiments, the bypass exhaust stack draft sensor 315 is located at the intersection 245. Additional draft sensors can be positioned at other locations in the coke plant 100. For example, a draft sensor in the common tunnel could be used to detect a common tunnel draft indicative of the oven draft in multiple ovens proximate the draft sensor. An intersection draft sensor 317 detects a pressure that is indicative of the draft at one of the intersections 245.

An oven temperature sensor 320 detects the oven temperature and can be located in the oven crown 180 or elsewhere in the oven chamber 185. A sole flue temperature sensor 325 detects the sole flue temperature and is located in the sole flue 205. In some embodiments, the sole flue 205 is divided into two labyrinths 205A and 205B with each labyrinth in fluid communication with one of the oven's two uptake ducts 225. A flue temperature sensor 325 is located in each of the sole flue labyrinths so that the sole flue temperature can be detected in each labyrinth. An uptake duct temperature sensor 330 detects the uptake duct temperature and is located in the uptake duct 225. A common tunnel temperature sensor 335 detects the common tunnel temperature and is located in the common tunnel 110. A HRSG inlet temperature sensor 340 detects the HRSG inlet temperature and is located at or near the inlet of the HRSG 120. Additional temperature sensors can be positioned at other locations in the coke plant 100.

An uptake duct oxygen sensor 345 is positioned to detect the oxygen concentration of the exhaust gases in the uptake duct 225. An HRSG inlet oxygen sensor 350 is positioned to detect the oxygen concentration of the exhaust gases at the inlet of the HRSG 120. A main stack oxygen sensor 360 is positioned to detect the oxygen concentration of the exhaust gases in the main stack 145 and additional oxygen sensors can be positioned at other locations in the coke plant 100 to provide information on the relative oxygen concentration at various locations in the system.

A flow sensor detects the gas flow rate of the exhaust gases. For example, a flow sensor can be located downstream of each of the HRSGs 120 to detect the flow rate of the exhaust gases exiting each HRSG 120. This information can be used to balance the flow of exhaust gases through each HRSG 120 by adjusting the HRSG dampers 250 and thereby optimize gas sharing among the HRSGs 120. Additional flow sensors can be positioned at other location sin the coke plant 100 to provide information on the gas flow rate at various locations in the system.

Additionally, one or more draft or pressure sensors, temperature sensors, oxygen sensors, flow sensors, and/or other sensors may be used at the air quality control system 130 or other locations downstream of the HRSGs 120.

It can be important to keep the sensors clean. One method of keeping a sensor clean is to periodically remove the sensor and manually clean it. Alternatively, the sensor can be periodically subjected to a burst, blast, or flow of a high pressure gas to remove build up at the sensor. As a further alternatively, a small continuous gas flow can be provided to continually clean the sensor.

The automatic uptake damper 305 includes the uptake damper 230 and an actuator 365 configured to open and close the uptake damper 230. For example, the actuator 365 can be a linear actuator or a rotational actuator. The actuator 365 allows the uptake damper 230 to be infinitely controlled between the fully open and the fully closed positions. The actuator 365 moves the uptake damper 230 amongst these positions in response to the operating condition or operating conditions detected by the sensor or sensors included in the automatic draft control system 300. This provides much greater control than a conventional uptake damper. A conventional uptake damper has a limited number of fixed positions between fully open and fully closed and must be manually adjusted amongst these positions by an operator.

The uptake dampers 230 are periodically adjusted to maintain the appropriate oven draft (e.g., at least 0.1 inches of water) which changes in response to many different factors within the ovens or the hot exhaust system. When the common tunnel 110 has a relatively low common tunnel draft (i.e., closer to atmospheric pressure than a relatively high draft), the uptake damper 230 can be opened to increase the oven draft to ensure the oven draft remains at or above 0.1 inches of water. When the common tunnel 110 has a relatively high common tunnel draft, the uptake damper 230 can be closed to decrease the oven draft, thereby reducing the amount of air drawn into the oven chamber 185.

With conventional uptake dampers, the uptake dampers are manually adjusted and therefore optimizing the oven draft is part art and part science, a product of operator experience and awareness. The automatic draft control system 300 described herein automates control of the uptake dampers 230 and allows for continuous optimization of the position of the uptake dampers 230 thereby replacing at least some of the necessary operator experience and awareness. The automatic draft control system 300 can be used to maintain an oven draft at a targeted oven draft (e.g., at least 0.1 inches of water), control the amount of excess air in the oven 105, or achieve other desirable effects by automatically adjusting the position of the uptake damper 230. The automatic draft control system 300 makes it easier to achieve the gas sharing described above by allowing for a high intersection draft at one or more of the intersections 245 and/or a high common tunnel draft at one or more locations along the common tunnel 110 while maintaining oven drafts low enough to prevent excess air leaks into the ovens 105. Without automatic control, it would be difficult if not impossible to manually adjust the uptake dampers 230 as frequently as would be required to maintain the oven draft of at least 0.1 inches of water without allowing the pressure in the oven to drift to positive. Typically, with manual control, the target oven draft is greater than 0.1 inches of water, which leads to more air leakage into the coke oven 105. For a conventional uptake damper, an operator monitors various oven temperatures and visually observes the coking process in the coke oven to determine when to and how much to adjust the uptake damper. The operator has no specific information about the draft (pressure) within the coke oven.

The actuator 365 positions the uptake damper 230 based on position instructions received from a controller 370. The position instructions can be generated in response to the draft, temperature, oxygen concentration, or gas flow rate detected by one or more of the sensors discussed above, control algorithms that include one or more sensor inputs, or other control algorithms. The controller 370 can be a discrete controller associated with a single automatic uptake damper 305 or multiple automatic uptake dampers 305, a centralized controller (e.g., a distributed control system or a programmable logic control system), or a combination of the two. In some embodiments, the controller 370 utilizes proportional-integral-derivative ("PID") control.

The automatic draft control system 300 can, for example, control the automatic uptake damper 305 of an oven 105 in response to the oven draft detected by the oven draft sensor 310. The oven draft sensor 310 detects the oven draft and outputs a signal indicative of the oven draft to the controller 370. The controller 370 generates a position instruction in response to this sensor input and the actuator 365 moves the uptake damper 230 to the position required by the position instruction. In this way, the automatic control system 300 can be used to maintain a targeted oven draft (e.g., at least 0.1 inches of water). Similarly, the automatic draft control system 300 can control the automatic uptake dampers 305, the HRSG dampers 250, and the draft fan 140, as needed, to maintain targeted drafts at other locations within the coke plant 100 (e.g., a targeted intersection draft or a targeted common tunnel draft). For example, for gas sharing as described above, the intersection draft at one or more intersections 245 and/or the common tunnel draft at one or more locations along the common tunnel 110 needs to be maintained at least at 0.7 inches of water. The automatic draft control system 300 can be placed into a manual mode to allow for manual adjustment of the automatic uptake dampers 305, the HRSG dampers, and/or the draft fan 140, as needed. Preferably, the automatic draft control system 300 includes a manual mode timer and upon expiration of the manual mode timer, the automatic draft control system 300 returns to automatic mode.

In some embodiments, the signal generated by the oven draft sensor 310 that is indicative of the detected pressure or draft is time averaged to achieve a stable pressure control in the coke oven 105. The time averaging of the signal can be accomplished by the controller 370. Time averaging the pressure signal helps to filter out normal fluctuations in the pressure signal and to filter out noise. Typically, the signal could be averaged over 30 seconds, 1 minute, 5 minutes, or over at least 10 minutes. In one embodiment, a rolling time average of the pressure signal is generated by taking 200 scans of the detected pressure at 50 milliseconds per scan. The larger the difference in the time-averaged pressure signal and the target oven draft, the automatic draft control system 300 enacts a larger change in the damper position to achieve the desired target draft. In some embodiments, the position instructions provided by the controller 370 to the automatic uptake damper 305 are linearly proportional to the difference in the time-averaged pressure signal and the target oven draft. In other embodiments, the position instructions provided by the controller 370 to the automatic uptake damper 305 are non-linearly proportional to the difference in the time-averaged pressure signal and the target oven draft. The other sensors previously discussed can similarly have time-averaged signals.

The automatic draft control system 300 can be operated to maintain a constant time-averaged oven draft within a specific tolerance of the target oven draft throughout the coking cycle. This tolerance can be, for example, +/−0.05 inches of water, +/−0.02 inches of water, or +/−0.01 inches of water.

The automatic draft control system 300 can also be operated to create a variable draft at the coke oven by adjusting the target oven draft over the course of the coking cycle. The target oven draft can be stepwise reduced as a function of the elapsed time of the coking cycle. In this manner, using a 48-hour coking cycle as an example, the target draft starts out relatively high (e.g. 0.2 inches of water) and is reduced every 12 hours by 0.05 inches of water so that the target oven draft is 0.2 inches of water for hours 1-12 of the coking cycle, 0.15 inches of water for hours 12-24 of the coking cycle, 0.01 inches of water for hours 24-36 of the coking cycle, and 0.05 inches of water for hours 36-48 of the coking cycle. Alternatively, the target draft can be linearly decreased throughout the coking cycle to a new, smaller value proportional to the elapsed time of the coking cycle.

As an example, if the oven draft of an oven 105 drops below the targeted oven draft (e.g., 0.1 inches of water) and the uptake damper 230 is fully open, the automatic draft control system 300 would increase the draft by opening at least one HRSG damper 250 to increase the oven draft. Because this increase in draft downstream of the oven 105 affects more than one oven 105, some ovens 105 might need to have their uptake dampers 230 adjusted (e.g., moved towards the fully closed position) to maintain the targeted oven draft (i.e., regulate the oven draft to prevent it from becoming too high). If the HRSG damper 250 was already fully open, the automatic damper control system 300 would need to have the draft fan 140 provide a larger draft. This increased draft downstream of all the HRSGs 120 would affect all the HRSG 120 and might require adjustment of the HRSG dampers 250 and the uptake dampers 230 to maintain target drafts throughout the coke plant 100.

As another example, the common tunnel draft can be minimized by requiring that at least one uptake damper 230 is fully open and that all the ovens 105 are at least at the targeted oven draft (e.g. 0.1 inches of water) with the HRSG dampers 250 and/or the draft fan 140 adjusted as needed to maintain these operating requirements.

As another example, the coke plant 100 can be run at variable draft for the intersection draft and/or the common tunnel draft to stabilize the air leakage rate, the mass flow, and the temperature and composition of the exhaust gases (e.g. oxygen levels), among other desirable benefits. This is accomplished by varying the intersection draft and/or the common tunnel draft from a relatively high draft (e.g. 0.8 inches of water) when the coke ovens 105 are pushed and reducing gradually to a relatively low draft (e.g. 0.4 inches of water), that is, running at relatively high draft in the early part of the coking cycle and at relatively low draft in the late part of the coking cycle. The draft can be varied continuously or in a step-wise fashion.

As another example, if the common tunnel draft decreases too much, the HRSG damper 250 would open to raise the common tunnel draft to meet the target common tunnel draft at one or more locations along the common tunnel 110 (e.g., 0.7 inches water) to allow gas sharing. After increasing the common tunnel draft by adjusting the HRSG damper 250, the uptake dampers 230 in the affected ovens 105 might be adjusted (e.g., moved towards the fully closed position) to maintain the targeted oven draft in the affected ovens 105 (i.e., regulate the oven draft to prevent it from becoming too high).

As another example, the automatic draft control system 300 can control the automatic uptake damper 305 of an oven 105 in response to the oven temperature detected by the oven temperature sensor 320 and/or the sole flue temperature detected by the sole flue temperature sensor or sensors 325. Adjusting the automatic uptake damper 305 in response to the oven temperature and or the sole flue temperature can optimize coke production or other desirable outcomes based on specified oven temperatures. When the sole flue 205 includes two labyrinths 205A and 205B, the temperature balance between the two labyrinths 205A and 205B can be controlled by the automatic draft control system 300. The automatic uptake damper 305 for each of the oven's two uptake ducts 225 is controlled in response to the sole flue temperature detected by the sole flue temperature sensor 325 located in labyrinth 205A or 205B associated with that uptake duct 225. The controller 370 compares the sole flue temperature detected in each of the labyrinths 205A and 205B and generates positional instructions for each of the two automatic uptake dampers 305 so that the sole flue temperature in each of the labyrinths 205A and 205B remains within a specified temperature range.

In some embodiments, the two automatic uptake dampers 305 are moved together to the same positions or synchronized. The automatic uptake damper 305 closest to the front door 165 is known as the "push-side" damper and the automatic uptake damper closet to the rear door 170 is known as the "coke-side" damper. In this manner, a single oven draft pressure sensor 310 provides signals and is used to adjust both the push- and coke-side automatic uptake dampers 305 identically. For example, if the position instruction from the controller to the automatic uptake dampers 305 is at 60% open, both push- and coke-side automatic uptake dampers 305 are positioned at 60% open. If the position instruction from the controller to the automatic uptake dampers 305 is 8 inches open, both push- and coke-side automatic uptake dampers 305 are 8 inches open. Alternatively, the two automatic uptake dampers 305 are moved to different positions to create a bias. For example, for a bias of 1 inch, if the position instruction for synchronized automatic uptake dampers 305 would be 8 inches open, for biased automatic uptake dampers 305, one of the automatic uptake dampers 305 would be 9 inches open and the other automatic uptake damper 305 would be 7 inches open. The total open area and pressure drop across the biased automatic uptake dampers 305 remains constant when compared to the synchronized automatic uptake dampers 305. The automatic uptake dampers 305 can be operated in synchronized or biased manners as needed. The bias can be used to try to maintain equal temperatures in the push-side and the coke-side of the coke oven 105. For example, the sole flue temperatures measured in each of the sole flue labyrinths 205A and 205B (one on the coke-side and the other on the push-side) can be measured and then corresponding automatic uptake damper 305 can be adjusted to achieve the target oven draft, while simultaneously using the difference in the coke- and push-side sole flue temperatures to introduce a bias proportional to the difference in sole flue temperatures between the coke-side sole flue and push-side sole flue temperatures. In this way, the push- and coke-side sole flue temperatures can be made to be equal within a certain tolerance. The tolerance (difference between coke- and push-side sole flue temperatures) can be 250° Fahrenheit, 100° Fahrenheit, 50° Fahrenheit, or, preferably 25° Fahrenheit or smaller. Using state-of-the-art control methodologies and techniques, the coke-side sole flue and the push-side sole flue temperatures can be brought within the tolerance value of each other over the course of one or more hours (e.g. 1-3 hours), while simultaneously controlling the oven draft to the target oven draft within a specified tolerance (e.g. +/−0.01 inches of water). Biasing the automatic uptake dampers 305 based on the sole flue temperatures measured in each of the sole flue labyrinths 205A and 205B, allows heat to be transferred between the push side and coke side of the coke oven 105. Typically, because the push side and the coke side of the coke bed coke at different rates, there is a need to move heat from the push side to the coke side. Also, biasing the automatic uptake dampers 305 based on the sole flue temperatures measured in each of the sole flue labyrinths 205A and 205B, helps to maintain the oven floor at a relatively even temperature across the entire floor.

The oven temperature sensor 320, the sole flue temperature sensor 325, the uptake duct temperature sensor 330, the common tunnel temperature sensor 335, and the HRSG inlet temperature sensor 340 can be used to detect overheat conditions at each of their respective locations. These detected temperatures can generate position instructions to allow excess air into one or more ovens 105 by opening one or more automatic uptake dampers 305. Excess air (i.e., where the oxygen present is above the stoichiometric ratio for combustion) results in uncombusted oxygen and uncombusted nitrogen in the oven 105 and in the exhaust gases. This excess air has a lower temperature than the other exhaust gases and provides a cooling effect that eliminates overheat conditions elsewhere in the coke plant 100.

As another example, the automatic draft control system 300 can control the automatic uptake damper 305 of an oven 105 in response to uptake duct oxygen concentration detected by the uptake duct oxygen sensor 345. Adjusting the automatic uptake damper 305 in response to the uptake duct oxygen concentration can be done to ensure that the exhaust gases exiting the oven 105 are fully combusted and/or that the exhaust gases exiting the oven 105 do not contain too much excess air or oxygen. Similarly, the automatic uptake damper 305 can be adjusted in response to the HRSG inlet oxygen concentration detected by the HRSG inlet oxygen sensor 350 to keep the HRSG inlet oxygen concentration above a threshold concentration that protects the HRSG 120 from unwanted combustion of the exhaust gases occurring at the HRSG 120. The HRSG inlet oxygen sensor 350 detects a minimum oxygen concentration to ensure that all of the combustibles have combusted before entering the HRSG 120. Also, the automatic uptake damper 305 can be adjusted in response to the main stack oxygen concentration detected by the main stack oxygen sensor 360 to reduce the effect of air leaks into the coke plant 100. Such air leaks can be detected based on the oxygen concentration in the main stack 145.

The automatic draft control system 300 can also control the automatic uptake dampers 305 based on elapsed time within the coking cycle. This allows for automatic control without having to install an oven draft sensor 310 or other sensor in each oven 105. For example, the position instructions for the automatic uptake dampers 305 could be based on historical actuator position data or damper position data from previous coking cycles for one or more coke ovens 105 such that the automatic uptake damper 305 is controlled based on the historical positioning data in relation to the elapsed time in the current coking cycle.

The automatic draft control system 300 can also control the automatic uptake dampers 305 in response to sensor inputs from one or more of the sensors discussed above. Inferential control allows each coke oven 105 to be controlled based on anticipated changes in the oven's or coke plant's operating conditions (e.g., draft/pressure, temperature, oxygen concentration at various locations in the oven 105 or the coke plant 100) rather than reacting to the actual detected operating condition or conditions. For example, using inferential control, a change in the detected oven draft that shows that the oven draft is dropping towards the targeted oven draft (e.g., at least 0.1 inches of water) based on multiple readings from the oven draft sensor 310 over a period of time, can be used to anticipate a predicted oven draft below the targeted oven draft to anticipate the actual oven draft dropping below the targeted oven draft and generate a position instruction based on the predicted oven draft to change the position of the automatic uptake damper 305 in response to the anticipated oven draft, rather than waiting for the actual oven draft to drop below the targeted oven draft before generating the position instruction. Inferential control can be used to take into account the interplay between the various operating conditions at various locations in the coke plant 100. For example, inferential control taking into account a requirement to always keep the oven under negative pressure, controlling to the required optimal oven temperature, sole flue temperature, and maximum common tunnel temperature while minimizing the oven draft is used to position the automatic uptake damper 305. Inferential control allows the controller 370 to make predictions based on known coking cycle characteristics and the operating condition inputs provided by the various sensors described above. Another example of inferential control allows the automatic uptake dampers 305 of each oven 105 to be adjusted to maximize a control algorithm that results in an optimal balance among coke yield, coke quality, and power generation. Alternatively, the uptake dampers 305 could be adjusted to maximize one of coke yield, coke quality, and power generation.

Alternatively, similar automatic draft control systems could be used to automate the primary air dampers 195, the secondary air dampers 220, and/or the tertiary air dampers 229 in order to control the rate and location of combustion at various locations within an oven 105. For example, air could be added via an automatic secondary air damper in response to one or more of draft, temperature, and oxygen concentration detected by an appropriate sensor positioned in the sole flue 205 or appropriate sensors positioned in each of the sole flue labyrinths 205A and 205B.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It should be noted that the orientation of various elements may differ according to other exemplary embodiments, and that such variations are intended to be encompassed by the present disclosure.

It is also important to note that the constructions and arrangements of the apparatus, systems, and methods as described and shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A method of operating a coke producing plant comprising:
   providing a plurality of coke ovens to produce coke and exhaust gases;
   directing the exhaust gases from each coke oven to a common tunnel;
   fluidly connecting a plurality of heat recovery steam generators to the common tunnel in parallel;
   operating all of the heat recovery steam generators at a first capacity and dividing the hot exhaust gases such that a portion of the hot exhaust gases flows through each of the heat recovery steam generators; and
   in a gas sharing operating mode, stopping operation of at least one of the plurality of heat recovery steam generators, operating at least one of the remaining plurality of heat recovery generators at a second capacity that is greater than the first capacity, and dividing the exhaust gases among the remaining operating plurality of heat recovery steam generators such that a portion of the exhaust gases flows through each of the remaining operating heat recovery steam generators.

2. The method of claim 1, further comprising:
   maintaining operating conditions within each coke oven at an oven draft of at least 0.1 inches of water.

3. The method of claim 2, further comprising:
   maintaining operating conditions at a location within the common tunnel at a common tunnel draft of at least 0.7 inches of water.

4. The method of claim 2, further comprising:
   maintaining operating conditions at a location within the common tunnel at a common tunnel draft of at least 1.0 inches of water.

5. The method of claim 2, further comprising:
   maintaining operating conditions at a location within the common tunnel at a common tunnel draft of at least 2.0 inches of water.

6. The method of claim 1, further comprising:
   maintaining operating conditions at a location within the common tunnel at a common tunnel draft of at least 0.7 inches of water.

7. The method of claim 1, further comprising:
   maintaining operating conditions at a location within the common tunnel at a common tunnel draft of at least 1.0 inches of water.

8. The method of claim 1, further comprising:
maintaining operating conditions at a location within the common tunnel at a common tunnel draft of at least 2.0 inches of water.

9. The method of claim 1, further comprising:
in a normal operating mode, maintaining operating conditions at a location within the common tunnel at a common tunnel draft of less than 0.7 inches of water; and
in the gas sharing operating mode, maintaining operating conditions at the location within the common tunnel at a common tunnel draft greater than 0.7 inches of water.

10. The method of claim 9, further comprising:
in the normal operating mode, maintaining operating conditions at a location within the common tunnel at a common tunnel draft of less than 0.6 inches of water; and
in the gas sharing operating mode, maintaining operating conditions at the location within the common tunnel at a common tunnel draft greater than 1.2 inches of water.

11. The method of claim 1, further comprising:
providing a plurality of crossover ducts, wherein each crossover duct is connected to one of the heat recovery steam generators and connected to the common tunnel at an intersection.

12. The method of claim 11, further comprising:
maintaining operating conditions at one or more intersections at an intersection draft of at least 0.7 inches of water.

13. The method of claim 11, further comprising:
maintaining operating conditions at one or more intersections at an intersection draft of at least 1.0 inches of water.

14. The method of claim 11, further comprising:
maintaining operating conditions at one or more intersections at an intersection draft of at least 2.0 inches of water.

15. A method of operating a coke producing plant comprising:
providing a plurality of coke ovens wherein each coke oven is adapted to produce coke and exhaust gases;
providing a common tunnel fluidly connected to the plurality of coke ovens and being configured to receive the exhaust gases from each of the coke ovens;
providing a plurality of standard heat recovery steam generators, adapted to operate at a first capacity, fluidly connected to the common tunnel, wherein the ratio of coke ovens to standard heat recovery steam generators is at least 2.0:1;
providing a redundant heat recovery steam generator and fluidly connecting the redundant heat recovery steam generator to each of the plurality of coke ovens so that: (i) the recovery steam generators and the redundant heat recovery steam generator are all fluidly connected in parallel with each other; and (ii) the redundant heat recovery steam generator is adapted operate at a second capacity, which is higher than the first capacity, receive the exhaust gases and extract heat from the exhaust gases generated by any of the plurality of coke ovens when a capacity of at least one of the standard heat recovery steam generators is reduced.

16. The method of claim 15, further comprising simultaneously operating the plurality of standard heat recovery steam generators and the redundant heat recovery steam generator during a normal operating mode of the coke producing plant.

17. The method of claim 15, further comprising:
maintaining operating conditions of each coke oven at an oven draft of at least 0.1 inches of water.

18. The method of claim 17, further comprising:
maintaining operating conditions at a location within the common tunnel at a common tunnel draft of at least 0.7 inches of water.

19. The method of claim 17, further comprising:
maintaining operating conditions at a location within the common tunnel at a common tunnel draft of at least 1.0 inches of water.

20. The method of claim 17, further comprising:
maintaining operating conditions at a location within the common tunnel at a common tunnel draft of at least 2.0 inches of water.

21. The method of claim 15, further comprising:
maintaining operating conditions at a location within the common tunnel at a common tunnel draft of at least 0.7 inches of water.

22. The method of claim 15, further comprising:
maintaining operating conditions at a location within the common tunnel at a common tunnel draft of at least 1.0 inches of water.

23. The method of claim 15, further comprising:
maintaining operating conditions at a location within the common tunnel at a common tunnel draft of at least 2.0 inches of water.

24. The method of claim 15, further comprising:
providing a plurality of redundant heat recovery steam generators fluidly connected to each of the plurality of coke ovens.

25. A method of operating a coke producing plant comprising:
providing a plurality of coke ovens, wherein each coke oven is adapted to produce coke and exhaust gases;
providing a common tunnel fluidly connected to the plurality of coke ovens and being configured to receive the exhaust gases from each of the coke ovens;
providing a plurality of heat recovery steam generators that are fluidly connected in parallel with each other;
providing a plurality of crossover ducts, each crossover duct adapted to fluidly connect the common tunnel to one of the plurality of heat recovery steam generators at an intersection;
reducing a capacity of at least one of the plurality of heat recovery steam generators below a capacity of the remaining plurality of heat recovery steam generators;
increasing a capacity of at least one of the plurality of heat recovery steam generators above the capacity of the at least one reduced capacity heat recovery steam generator; and
controlling operating conditions at one or more of the intersections to maintain an intersection draft of at least 0.7 inches of water.

26. The method of claim 25, further comprising:
controlling the operating conditions at one or more of the intersections to maintain an intersection draft of at least 1.0 inches of water.

27. The method of claim 25, further comprising:
controlling the operating conditions at one or more of the intersections to maintain an intersection draft of at least 2.0 inches of water.

28. The method of claim 25, further comprising:
controlling the operating conditions within each coke oven to maintain an oven draft of at least 0.1 inches of water.

* * * * *

UNITED STATES PATENT AND TRADEMARK OFFICE
CERTIFICATE OF CORRECTION

| | | |
|---|---|---|
| PATENT NO. | : 9,243,186 B2 | Page 1 of 1 |
| APPLICATION NO. | : 13/588996 | |
| DATED | : January 26, 2016 | |
| INVENTOR(S) | : John F. Quanci et al. | |

It is certified that error appears in the above-identified patent and that said Letters Patent is hereby corrected as shown below:

Specification

In column 6, line 1, delete "($SO_X$)" and insert -- ($SO_x$) --, therefor.

In column 8, line 39, delete "HSRG" and insert -- HRSG --, therefor.

In column 8, line 42, delete "HSRG" and insert -- HRSG --, therefor.

In column 13, line 37, delete "location sin" and insert -- locations in --, therefor.

In column 16, line 42, delete "and or" and insert -- and/or --, therefor.

Claims

In column 21, line 49, in claim 15, delete "2.0:1;" and insert -- 20:1; --, therefor.

In column 21, line 53, in claim 15, before "recovery" insert -- standard heat --.

Signed and Sealed this
Seventh Day of June, 2016

Michelle K. Lee
*Director of the United States Patent and Trademark Office*